US009999175B2

(12) United States Patent
Baurer et al.

(10) Patent No.: US 9,999,175 B2
(45) Date of Patent: Jun. 19, 2018

(54) SYSTEMS, METHODS AND APPARATUS FOR MULTI-ROW AGRICULTURAL IMPLEMENT CONTROL AND MONITORING

(71) Applicant: Precision Planting LLC, Tremont, IL (US)

(72) Inventors: Phil Baurer, Tremont, IL (US); Tim Sauder, Tremont, IL (US); Jason Stoller, Morton, IL (US); Derek Sauder, Tremont, IL (US); Jeremy Hodel, Morton, IL (US); Doug Sauder, Livermore, CA (US)

(73) Assignee: Precision Planting LLC, Tremont, IL (US)

( * ) Notice: Subject to any disclaimer, the term of this patent is extended or adjusted under 35 U.S.C. 154(b) by 0 days. days.

(21) Appl. No.: 14/562,400

(22) Filed: Dec. 5, 2014

(65) Prior Publication Data

US 2015/0094916 A1 Apr. 2, 2015

Related U.S. Application Data

(63) Continuation-in-part of application No. PCT/US2013/051971, filed on Jul. 25, 2013.

(Continued)

(51) Int. Cl.
*A01C 7/10* (2006.01)
*A01B 49/06* (2006.01)
(Continued)

(52) U.S. Cl.
CPC ............. *A01C 7/105* (2013.01); *A01B 49/06* (2013.01); *A01C 7/06* (2013.01); *A01C 7/102* (2013.01);
(Continued)

(58) Field of Classification Search
CPC ........... A01C 7/105; A01C 7/102; A01C 7/20; A01C 7/16; A01C 21/00; A01C 21/002;
(Continued)

(56) References Cited

U.S. PATENT DOCUMENTS 6,009,354 A 12/1999 Flamme et al.
6,070,539 A * 6/2000 Flamme ............... A01B 79/005
111/177

(Continued)

FOREIGN PATENT DOCUMENTS

| EP | 2213153 A1 | 8/2010 |
| WO | 2012057327 A1 | 5/2012 |
| WO | 2012129442 A3 | 9/2012 |

OTHER PUBLICATIONS

File history for U.S. Appl. No. 14/417,146, filed Jan. 24, 2015, Inventors Phil Baurer, et al.

(Continued)

*Primary Examiner* — Mussa A Shaawat
*Assistant Examiner* — Michael V Kerrigan
(74) *Attorney, Agent, or Firm* — Thomas J. Oppold; Larkin Hoffman Daly & Lindgren, Ltd.

(57) ABSTRACT

Systems, methods and apparatus are provided for monitoring and controlling an agricultural implement, including seed planting implements. Systems, methods and apparatus are provided for detecting seeds being conveyed by seed conveyor. Systems, methods and apparatus are provided for monitoring and controlling deposition of secondary crop inputs such as fertilizer and insecticide.

20 Claims, 24 Drawing Sheets

Related U.S. Application Data

(60) Provisional application No. 61/675,714, filed on Jul. 25, 2012.

(51) Int. Cl.

| | | |
|---|---|---|
| *A01C 7/06* | (2006.01) | |
| *A01C 21/00* | (2006.01) | |
| *A01M 9/00* | (2006.01) | |
| *A01C 7/16* | (2006.01) | |
| *A01C 7/20* | (2006.01) | |
| *A01C 7/12* | (2006.01) | |
| *A01C 19/02* | (2006.01) | |
| *G01V 8/20* | (2006.01) | |
| *A01C 5/06* | (2006.01) | |

(52) U.S. Cl.
CPC ............... *A01C 7/128* (2013.01); *A01C 7/16* (2013.01); *A01C 7/20* (2013.01); *A01C 19/02* (2013.01); *A01C 21/00* (2013.01); *A01C 21/002* (2013.01); *A01C 21/005* (2013.01); *A01M 9/0092* (2013.01); *G01V 8/20* (2013.01); *A01C 5/064* (2013.01); *A01C 5/068* (2013.01); *A01C 7/203* (2013.01)

(58) Field of Classification Search
CPC ......... A01C 7/06; A01C 21/005; A01C 19/02; A01C 7/128; A01C 5/064; A01C 5/068; A01C 7/203; A01B 49/06; A01M 9/0092; G01V 8/20
See application file for complete search history.

(56) References Cited

U.S. PATENT DOCUMENTS

| | | |
|---|---|---|
| 6,389,999 B1 | 5/2002 | Duello |
| 6,938,564 B2 | 9/2005 | Conrad et al. |
| 7,481,171 B2 | 1/2009 | Martin |
| 8,074,586 B2 | 12/2011 | Garner et al. |
| 8,078,367 B2 | 12/2011 | Sauder et al. |
| 9,635,804 B2 | 5/2017 | Carr et al. |
| 2002/0099472 A1 | 7/2002 | Benneweis |
| 2002/0100401 A1* | 8/2002 | Lempriere ............ A01C 15/16 111/178 |
| 2003/0159631 A1 | 8/2003 | Sauder et al. |
| 2006/0011647 A1 | 1/2006 | Sauder et al. |
| 2006/0032421 A1* | 2/2006 | Sauder .................... A01C 7/16 111/185 |
| 2006/0283363 A1 | 12/2006 | Wollman et al. |
| 2010/0180695 A1 | 7/2010 | Sauder et al. |
| 2010/0251805 A1 | 10/2010 | Lehmann |
| 2012/0169353 A1 | 7/2012 | Sauder et al. |
| 2013/0333602 A1 | 12/2013 | Carr et al. |

OTHER PUBLICATIONS

File history for U.S. Appl. No. 15/150,403, filed May 9, 2016, Inventors Phil Baurer, et al.
International Search Report, dated Dec. 12, 2013, pp. 1-16.
European Search Report, dated Feb. 22, 2016, pp. 1-4.

\* cited by examiner

SYSTEMS, METHODS AND APPARATUS FOR MULTI-ROW AGRICULTURAL IMPLEMENT CONTROL AND MONITORING

BACKGROUND

As growers in recent years have increasingly incorporated additional sensors and controllers on agricultural implements such as row crop planters, the control and monitoring systems for such implements have grown increasingly complex. Installation and maintenance of such systems have become increasingly difficult. Thus there is a need in the art for effective control and monitoring of such systems. In planting implements incorporating seed conveyors and/or secondary crop input metering systems such as insecticide and fertilizer meters, special control and monitoring challenges arise; thus there is also a particular need for effective seed counting and effective incorporation of the seed conveyor and/or secondary crop input metering system into the implement control and monitoring system.

DESCRIPTION

Figure 1:
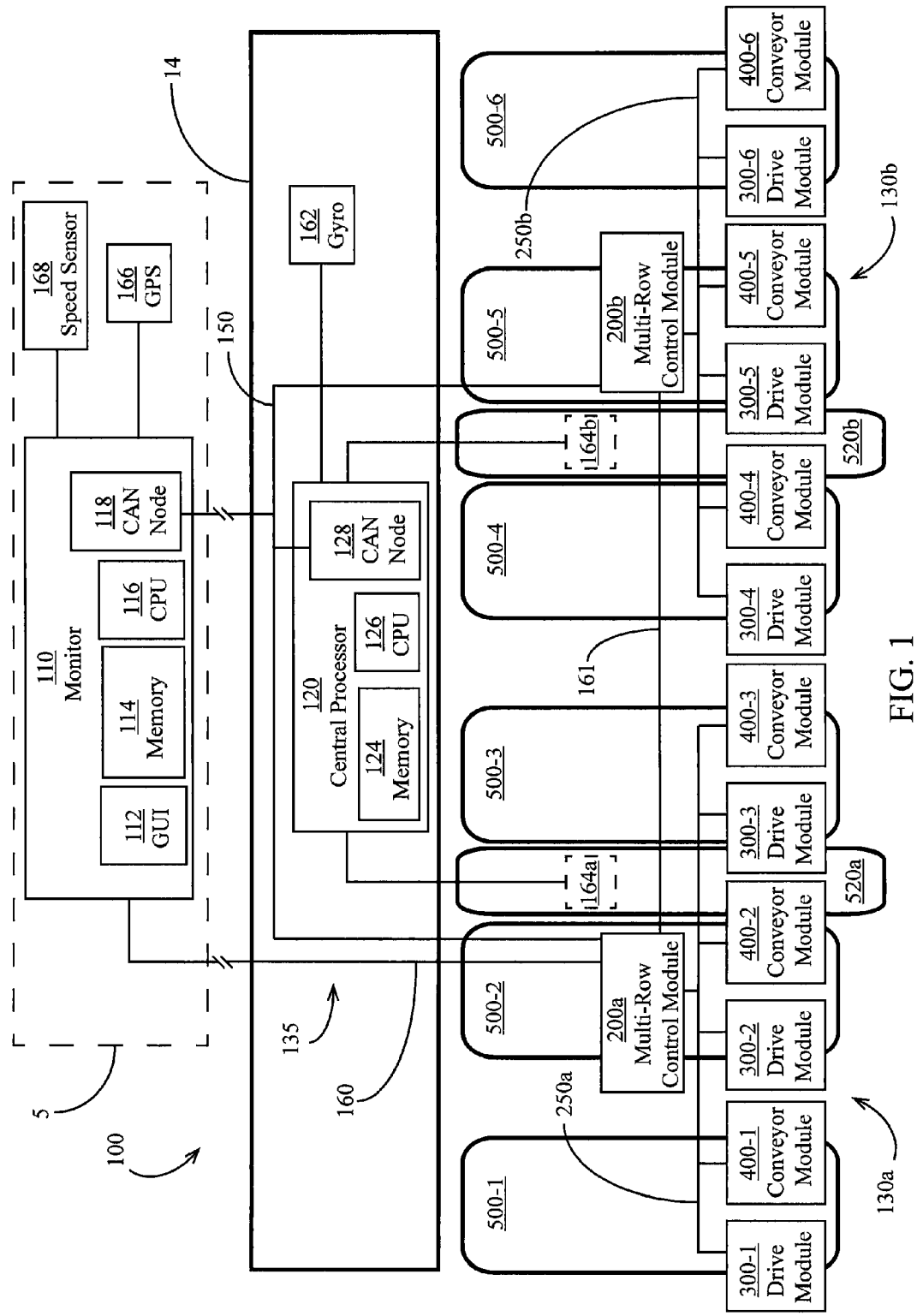
FIG. 1 schematically illustrates an embodiment of an electrical control system for controlling and monitoring an agricultural implement having a plurality of rows.

Referring now to the drawings, wherein like reference numerals designate identical or corresponding parts throughout the several views, FIG. 1 schematically illustrates an agricultural implement, e.g., a planter, comprising a toolbar 14 operatively supporting six row units 500. The toolbar 14 is supported by left and right implement wheels 520a,520b and drawn by a tractor 5. A control system 100 includes a monitor 110 preferably mounted in the tractor 5, an implement network 135, and two row networks 130a, 130b.

The monitor 110 preferably includes a graphical user interface ("GUI") 112, a memory 114, a central processing unit ("CPU") 116, and a bus node 118. The bus node 118 preferably comprises a controller area network ("CAN") node including a CAN transceiver, a controller, and a processor. The monitor 110 is preferably in electrical communication with a speed sensor 168 (e.g., a radar speed sensor mounted to the tractor 5) and a global positioning receiver ("GPS") receiver 166 mounted to the tractor 5 (or in some embodiments to the toolbar 14).

The implement network 135 preferably includes an implement bus 150 and a central processor 120. The central processor 120 is preferably mounted to the toolbar 14. Each bus described herein is preferably a CAN bus included within a harness which connects each module on the bus to power, ground, and bus signal lines (e.g., CAN-Hi and CAN-Lo).

The central processor 120 preferably includes a memory 124, a CPU 126, and a bus node 128 (preferably a CAN node including a CAN transceiver, a controller, and a processor). The implement bus 150 preferably comprises a CAN bus. The monitor 110 is preferably in electrical communication with the implement bus 150. The central processor 120 is preferably in electrical communication with wheel speed sensors 164a,164b (e.g., Hall-effect speed sensors) mounted to the left and right implement wheels 520a, 520b, respectively. The central processor 120 is preferably in electrical communication with a gyroscope 162 mounted to the toolbar 14.

Row Networks—Overview

Each row network 130 preferably includes a multi-row control module 200 mounted to one of the row units 500, a row bus 250, three drive modules 300 individually mounted to three row units 500, and three conveyor modules 400 individually mounted to three row units 500 respectively. Each row unit 500 having at least a drive module 300 in a particular row unit network 130 is described herein as being "within" that row network.

Row Networks—Multi-Row Control Module

Figure 2:
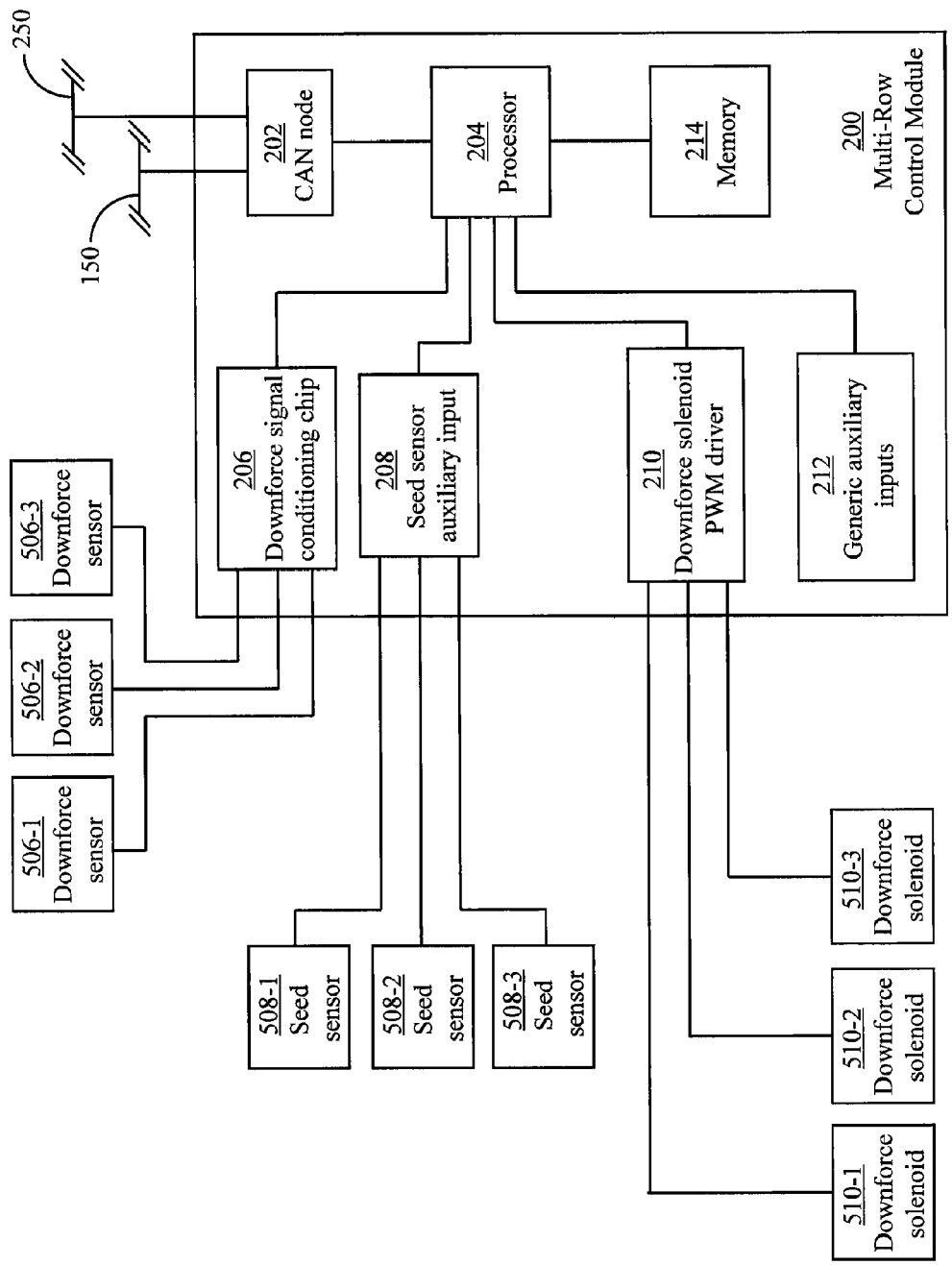
FIG. 2 schematically illustrates an embodiment of a multi-row control module.

Turning to FIG. 2, the multi-row control module 200 preferably includes a bus node 202 (preferably a CAN node including a CAN transceiver, a controller, and a processor). The CAN node, specifically the CAN transceiver, is preferably in electrical communication with the row bus 250 and the implement bus 150. The multi-row control module 200 further includes a memory 214 and a processor 204 in electrical communication with a downforce signal conditioning chip 206, a seed sensor auxiliary input 208, a downforce solenoid pulse-width modulation ("PWM") driver 210, and generic auxiliary inputs 212. The auxiliary inputs 212 are preferably configured for electrical communication with sensors including a pressure sensor and a lift switch. The downforce signal conditioning chip 206 is preferably in electrical communication with a downforce sensor 506 on each row unit 500 within the implement network 135. The downforce solenoid PWM driver 210 is preferably in electrical communication with a downforce solenoid 510 on each row unit within the row network 130. In embodiments including a seed tube (described in more detail herein with respect to FIG. 5A), the seed sensor auxiliary input 208 is preferably in electrical communication with a seed sensor 508 (e.g., an optical sensor) on each row unit 500 within the row network 130.

Row Networks—Drive Module

Figure 3:
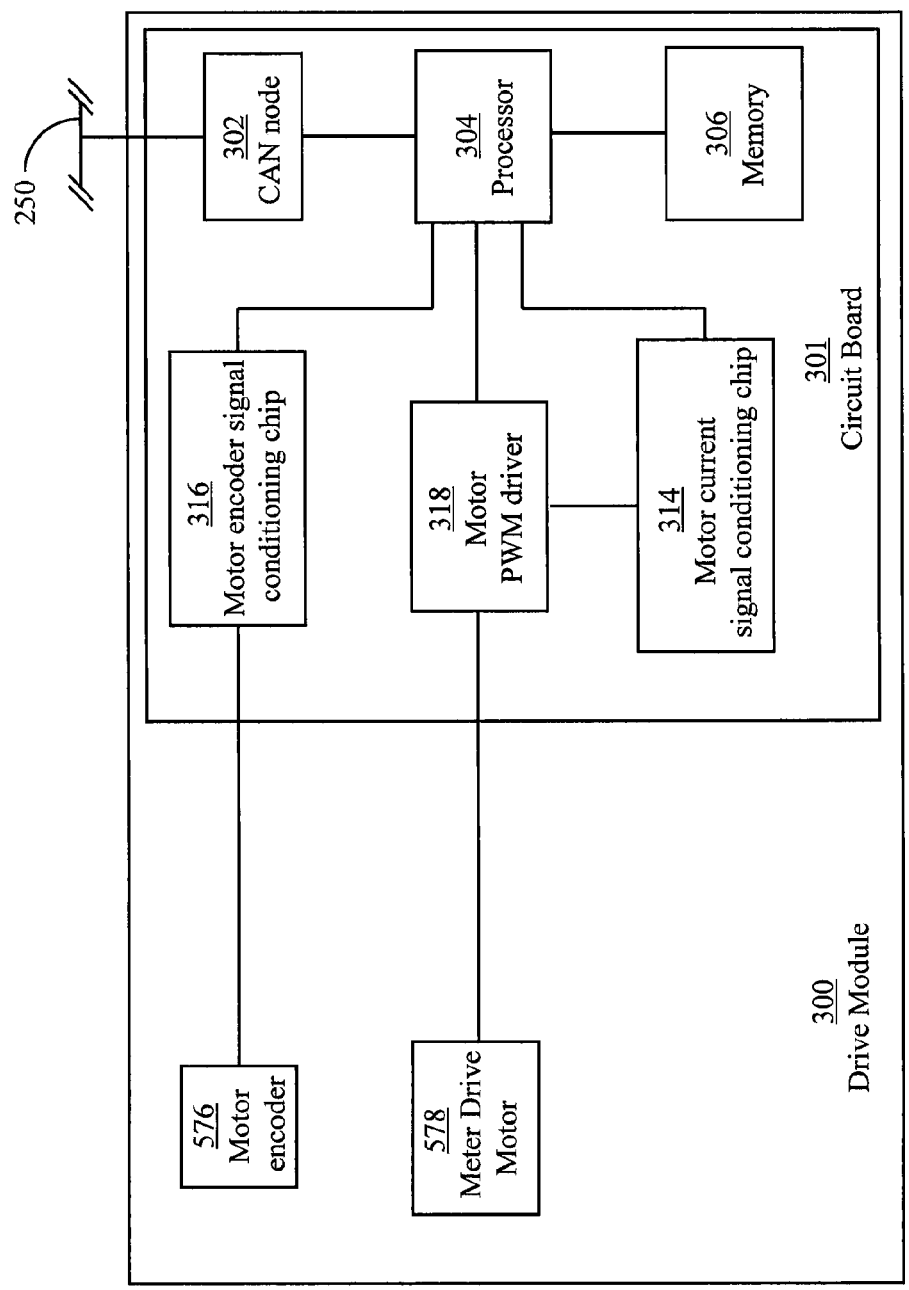
FIG. 3 schematically illustrates an embodiment of a drive module.

Turning to FIG. 3, the drive module 300 preferably includes circuit board 301, a motor encoder 576, and a meter drive motor 578. The circuit board 301 preferably includes a bus node 302 (preferably a CAN node including a CAN transceiver, a controller, and a processor). The CAN node, specifically the CAN transceiver, is preferably in electrical communication with the row bus 250. The drive module 300 preferably further includes a memory 306 and a processor 304 in electrical communication with a motor encoder signal conditioning chip 316, a motor PWM driver 318, and a motor current signal conditioning chip 314. The motor PWM driver 318 is preferably in electrical communication with a motor 578 for controlling an output speed of the motor 578. The motor encoder signal conditioning chip 316 is preferably in electrical communication with the motor encoder 576, which is preferably configured to generate a signal indicative of driving speed of the motor 570, e.g., by generating a defined number of encoder pulses per motor shaft rotation. The motor current signal conditioning chip 314 is preferably in electrical communication with the motor PWM driver 318 far sampling the actual current driving the motor 578.

Figure 10B:
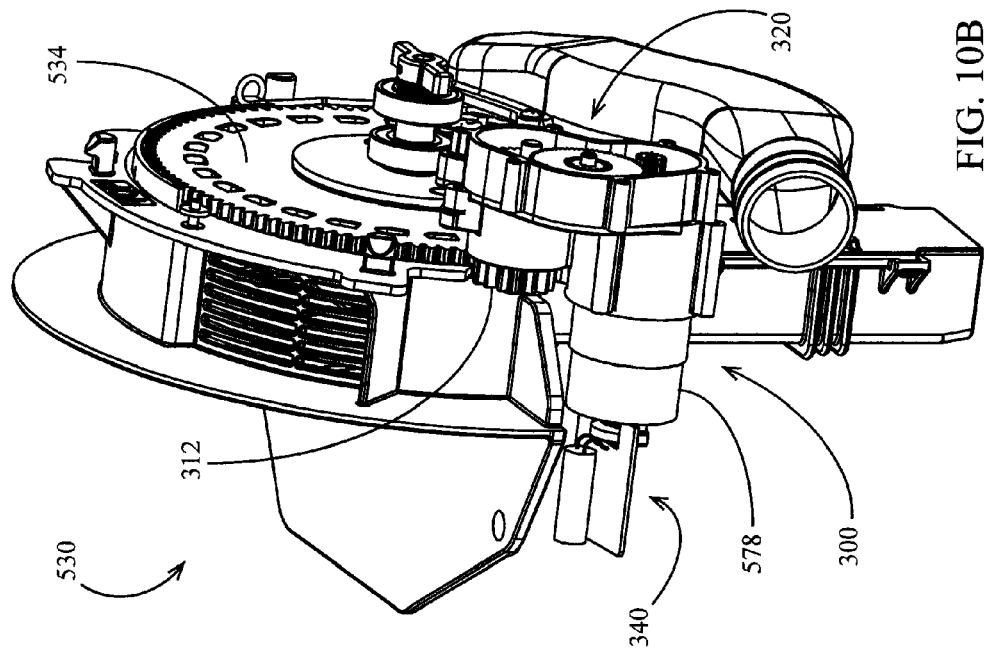
FIG. 10B is a perspective view of the seed meter and drive module of FIG. 10A with several covers removed for clarity.
Figure 10A:
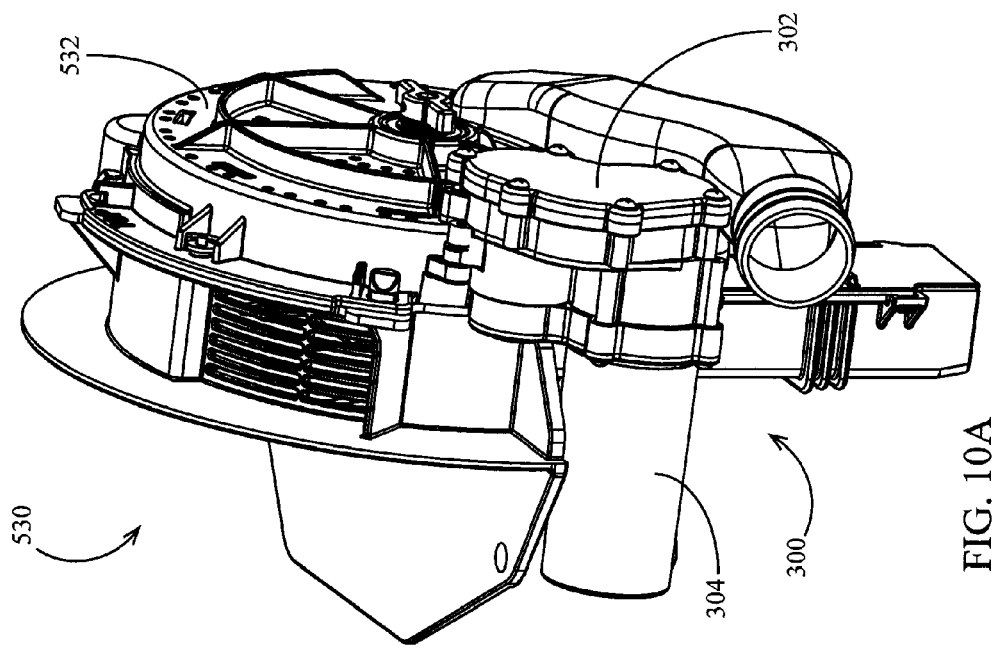
FIG. 10A is a perspective view of an embodiment of a seed meter incorporating an embodiment of a drive module.

Referring to FIGS. 10A and 10B, the drive module 300 comprises an electrical assembly 340 and motor 578 shielded by a cover 304 and a gearbox 320 shielded by a cover 302. The drive module 300 is mounted to a seed meter 530. The seed meter is preferably of the type disclosed in Applicant's co-pending international patent application no. PCT/US2012/030192, the disclosure of which is hereby incorporated herein in its entirety by reference. Specifically, the drive module 300 is preferably mounted to a cover 532 shielding a seed disc 534 housed within the meter 530. The gearbox 320 includes an output gear 312 adapted to drive the seed disc 534 by sequential engagement with gear teeth arranged circumferentially around a perimeter of the seed disc 534.

Figure 11B:
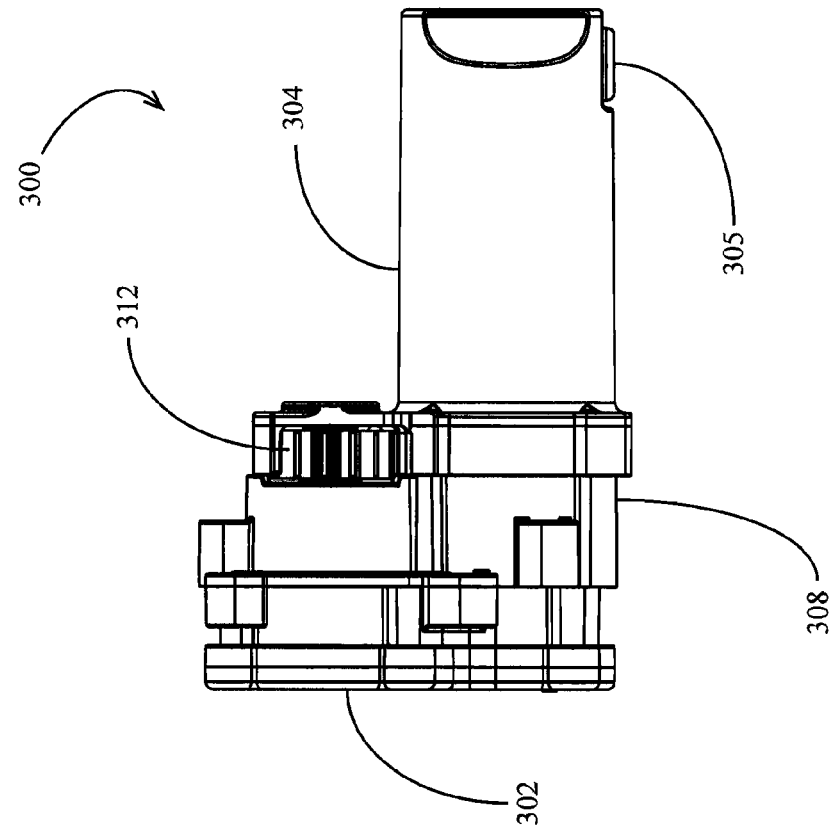
FIG. 11B is a side elevation view of the drive module of FIG. 10A.
Figure 11A:
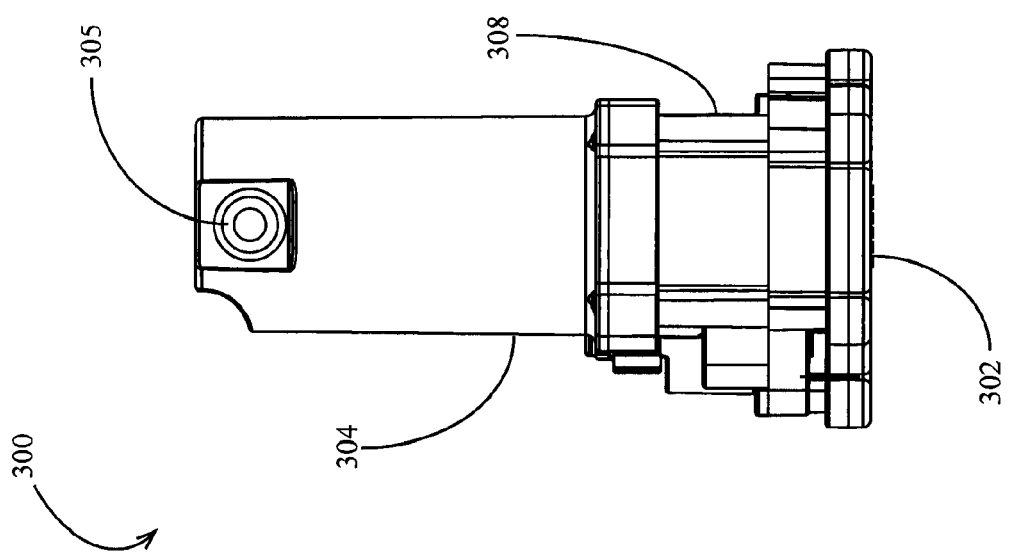
FIG. 11A is a bottom view of the drive module of FIG. 10A.
Figure 12B:
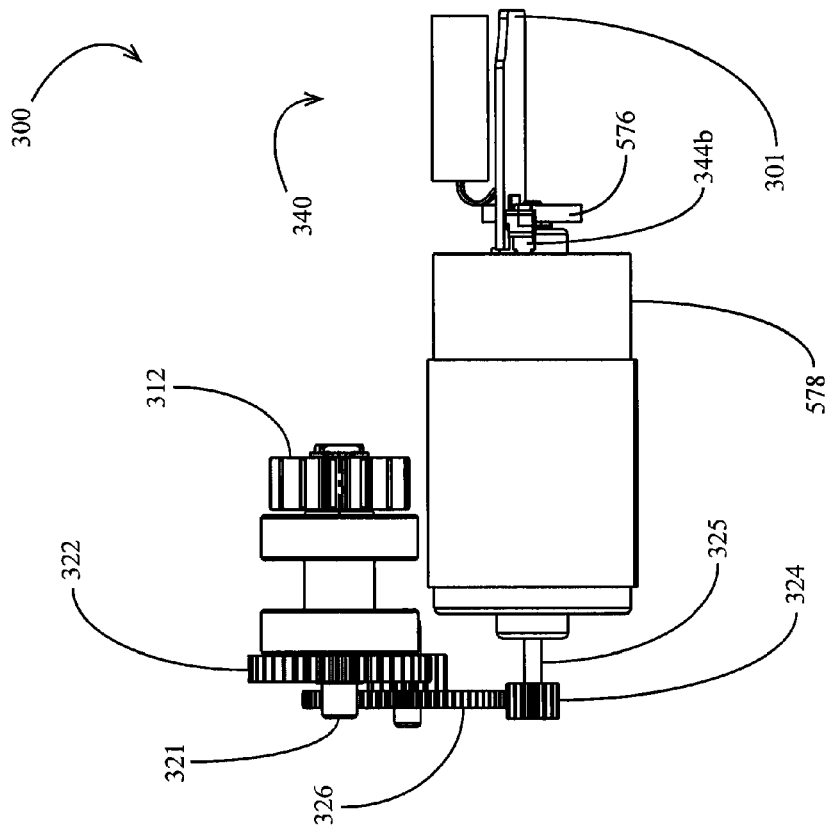
FIG. 12B is a side elevation view of the drive module of FIG. 10A with two covers and a housing removed for clarity.
Figure 12A:
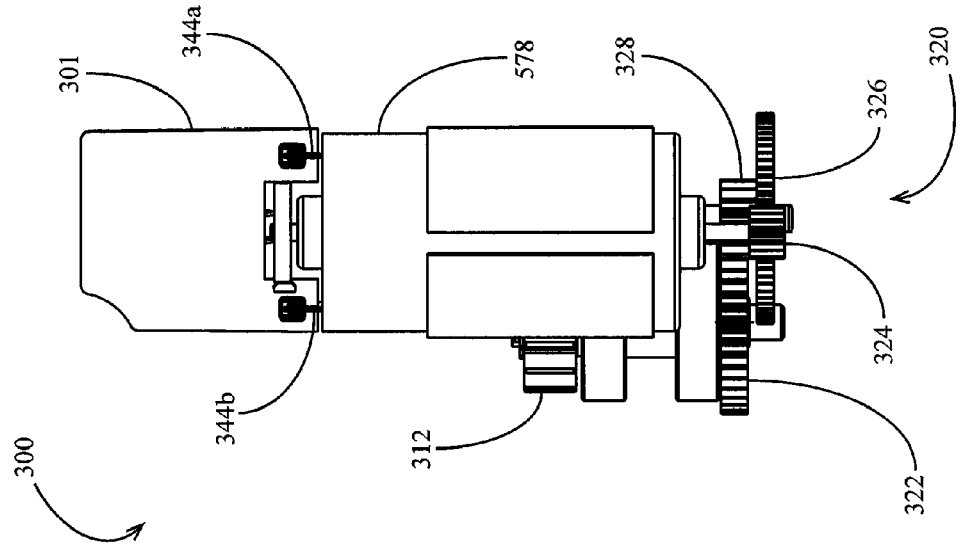
FIG. 12A is a bottom view of the drive module of FIG. 10A with two covers and a housing removed for clarity.

Turning to FIGS. 11A and 11B, the drive module 300 further includes a housing 308 to which the covers 302,304 are mounted. The cover 302 preferably includes rubber grommet 305 for introducing electrical leads into the cover 302.

Turning to FIGS. 12A, 12B, 14A, 14B, and 15, the gearbox 320 includes an input shaft 325 and input gear 324 driven by the motor 578. The input gear drives a first step-down gear 326 and a second step-down gear 328. The second step-down gear 328 preferably has a smaller diameter than the first step-down gear 326. The second step-down gear 328 is preferably mounted coaxially to the first step-down gear 326, e.g., by press fitting. The second step-down gear 328 preferably drives an intermediate gear 322. The intermediate gear 322 drives the output gear 312 via a shaft 321.

Continuing to refer to FIGS. 12A, 12B, 14A, 14B, and 15, the electrical assembly 340 includes the circuit board 301, the motor encoder 576 (preferably including a magnetic encoder disc), and two leads 344a,344b in electrical communication with the motor 578 for driving the motor.

Figure 13B:
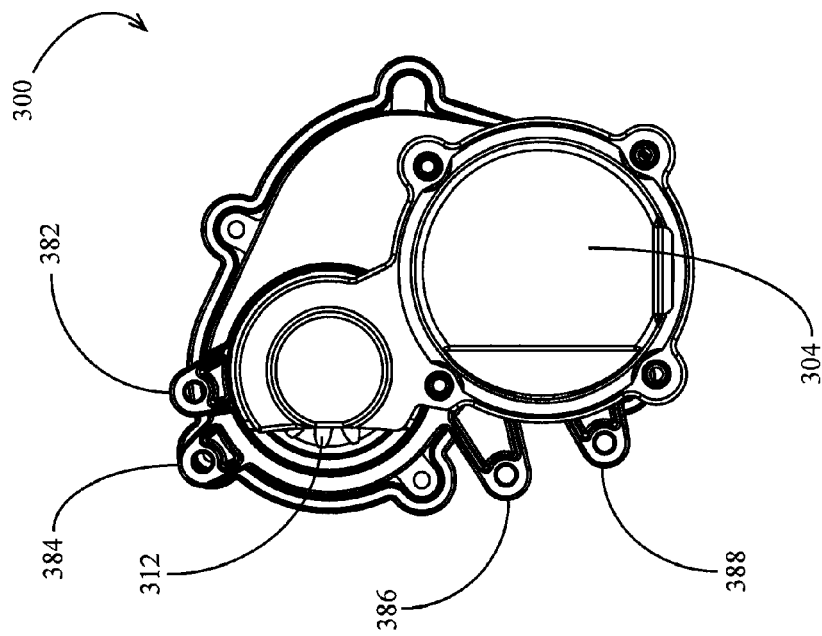
FIG. 13B is a rear view of the drive module of FIG. 10A.
Figure 13A:
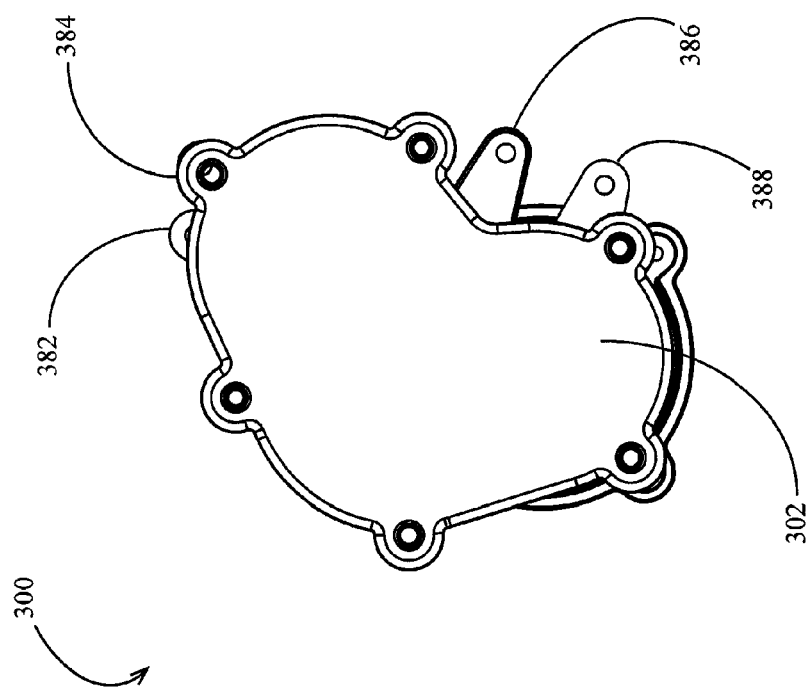
FIG. 13A is a front view of the drive module of FIG. 10A.
Figure 14B:
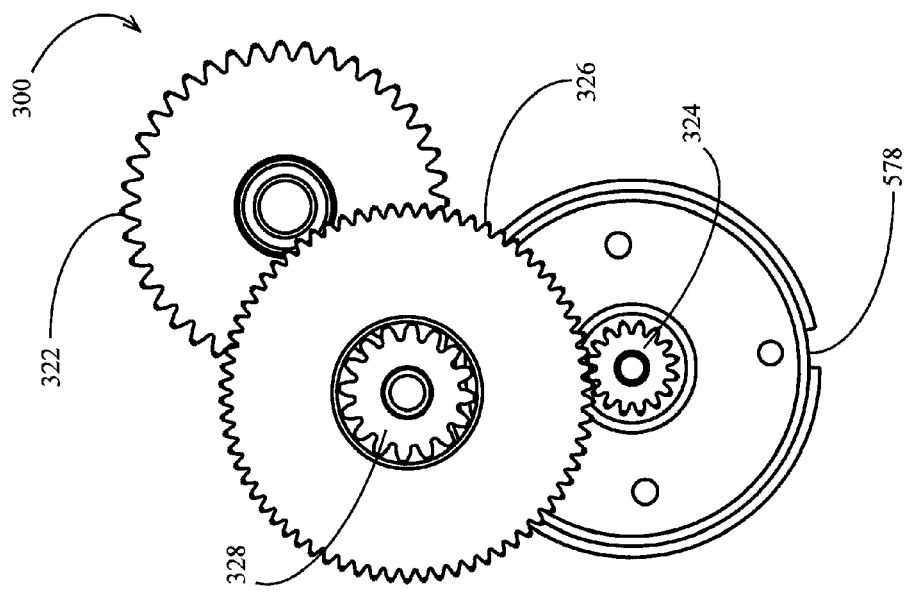
FIG. 14B is a rear view of the drive module of FIG. 10A with two covers and a housing removed for clarity.
Figure 14A:
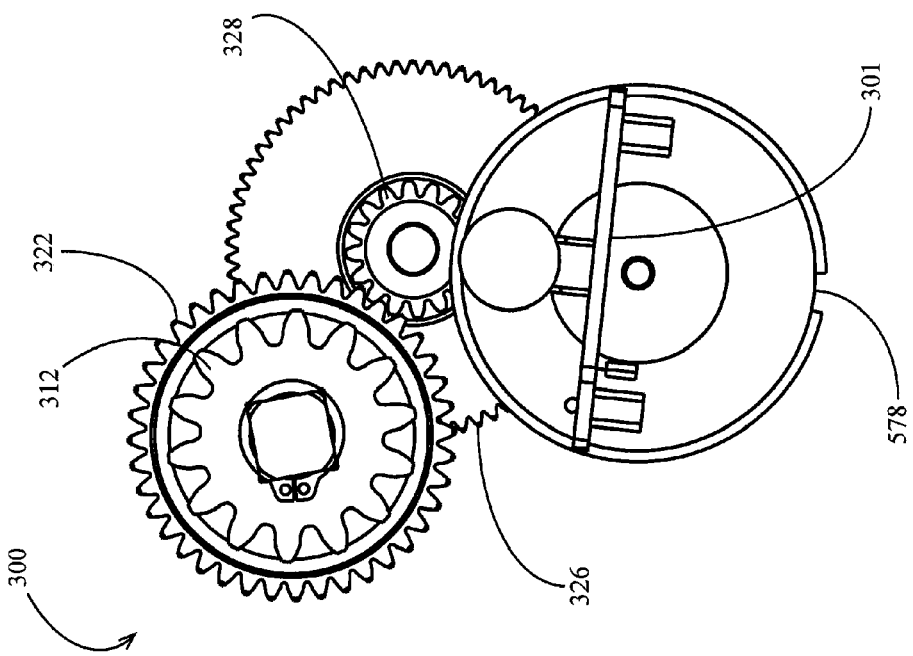
FIG. 14A is a front view of the drive module of FIG. 10A with two covers and a housing removed for clarity.
Figure 15:
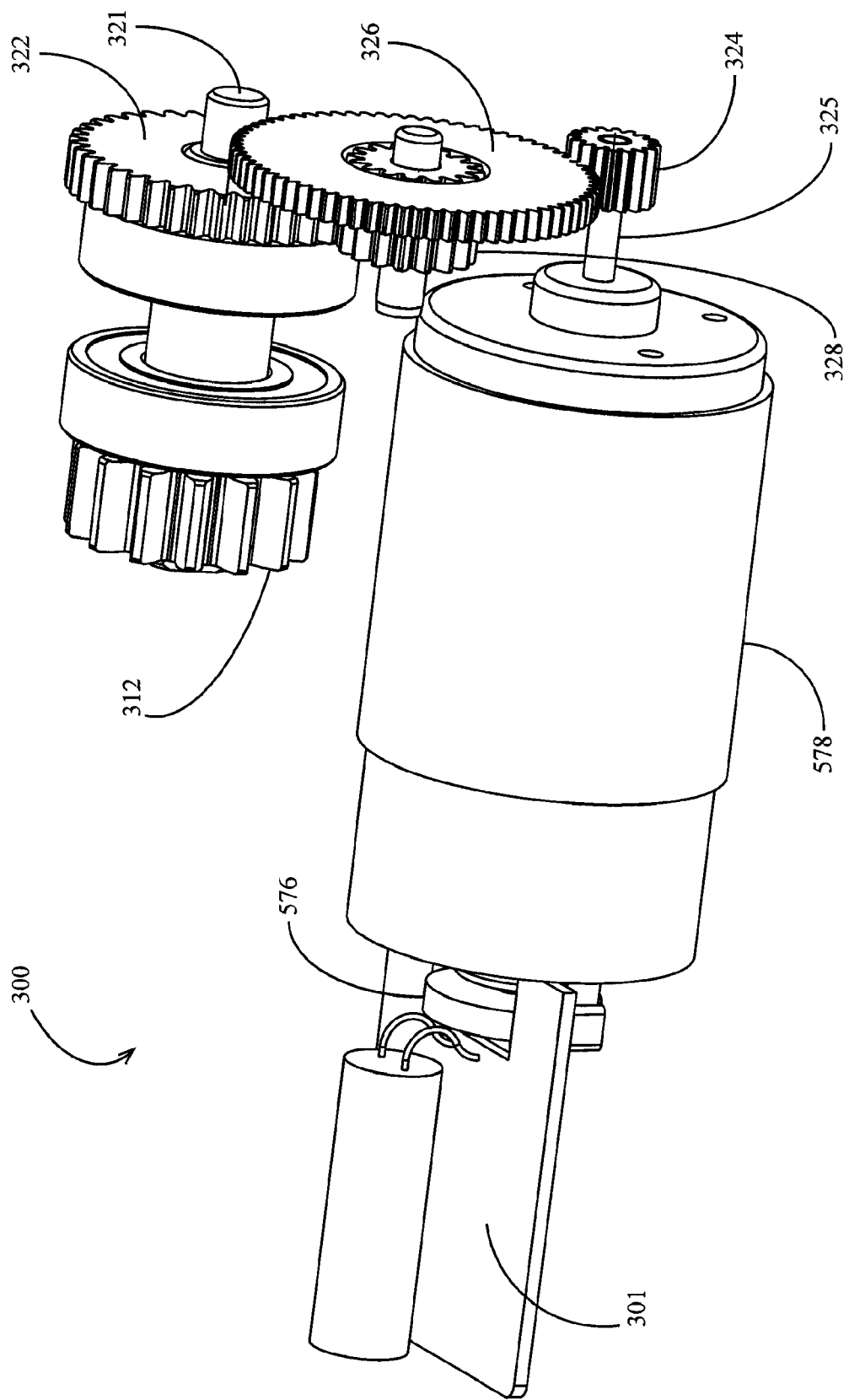
FIG. 15 is a perspective view of the drive module of FIG. 10A with two covers and a housing removed for clarity.

Referring to FIGS. 13A and 13B, the drive module 300 preferably includes mounting tabs 382,384,386,388 for mounting the drive module 300 to the seed meter 530 (e.g., by screws adapted to mate with threaded apertures in the cover 532).

Row Networks—Conveyor Module

Figure 4:
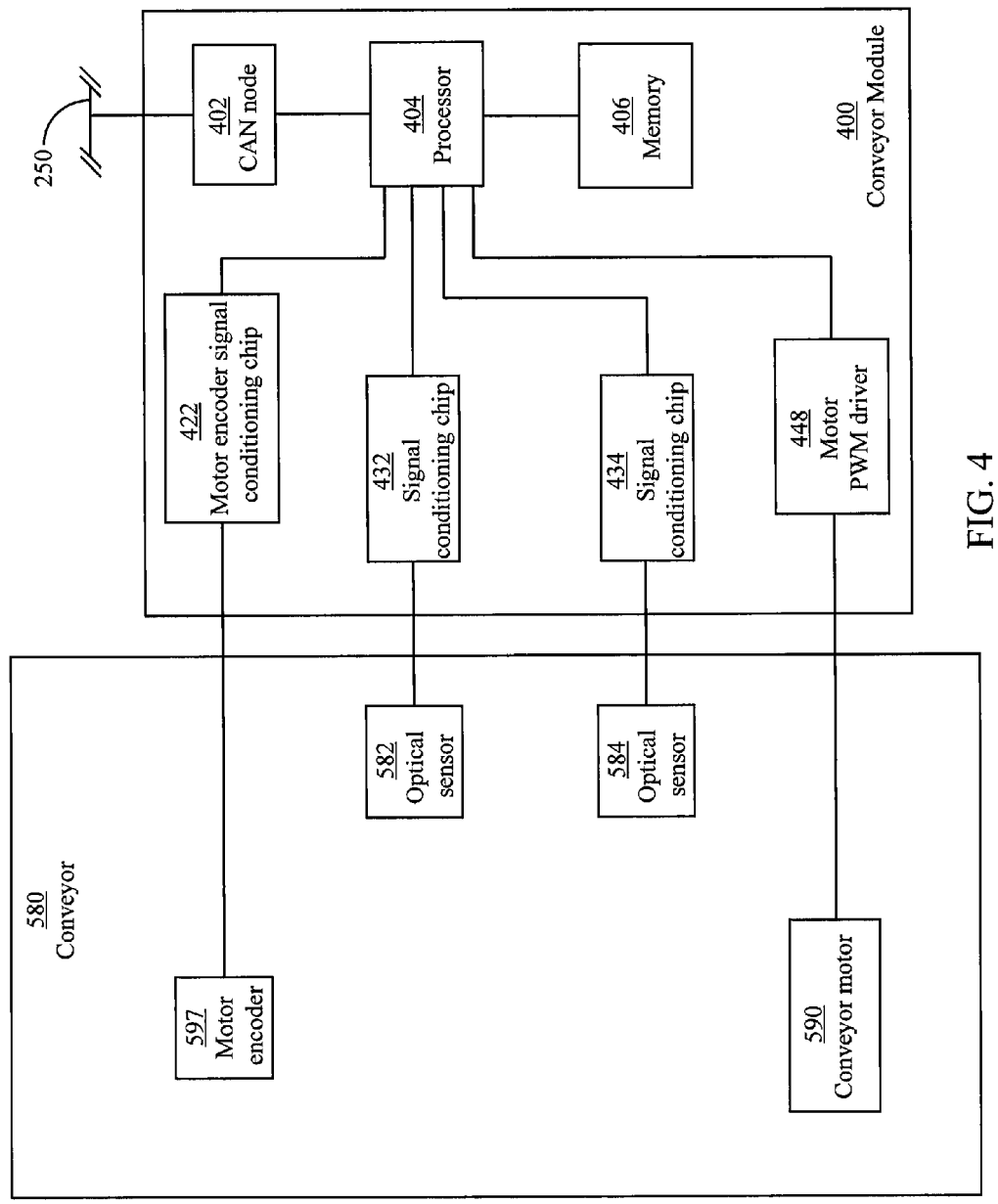
FIG. 4 schematically illustrates an embodiment of a conveyor module.

Turning to FIG. 4, the conveyor module 400 preferably includes a bus node 402 (preferably a CAN node including a CAN transceiver, a controller, and a processor). The CAN node, specifically the CAN transceiver, is preferably in electrical communication with the row bus 250. The conveyor module 400 preferably further includes a memory 406 and a processor 404 in electrical communication with a motor encoder signal conditioning chip 422, a motor PWM driver 448, and signal conditioning chips 432,434. The motor PWM driver 448 is in electrical communication with a conveyor motor 590 mounted to a conveyor 580. In some embodiments, the motor encoder signal conditioning chip 422 is in electrical communication with a motor encoder 597 disposed to measure an operating speed of the conveyor motor 590. The signal conditioning chips 432,434 are preferably in electrical communication with optical sensors 582,584, respectively.

Implementation on Planter Row Units

Figure 5A:
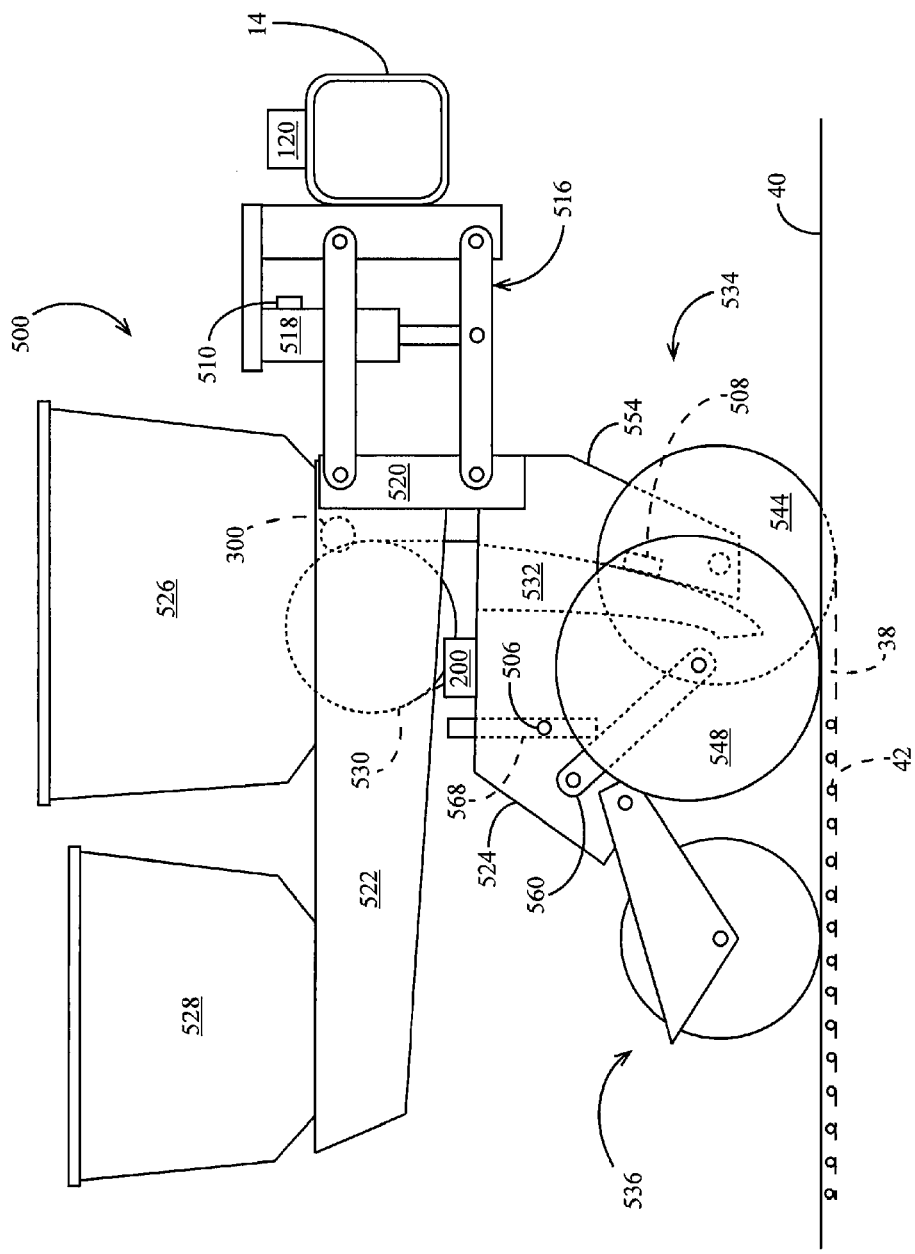
FIG. 5A is a side elevation view of a planter row unit including a seed tube and incorporating an embodiment of an electronic control system.

Referring to FIG. 5A, a planter row unit 500 is illustrated with components of the control system 100 installed. The row unit 500 illustrated in FIG. 5A is one of the row units to which a multi-row control module 200 is mounted.

In the row unit 500, a downforce actuator 510 (preferably a hydraulic cylinder) is mounted to the toolbar 14. The downforce actuator 510 is pivotally connected at a lower end to a parallel linkage 516. The parallel linkage 516 supports the row unit 500 from the toolbar 14, permitting each row unit to move vertically independently of the toolbar and the other spaced row units in order to accommodate changes in terrain or upon the row unit encountering a rock or other obstruction as the planter is drawn through the field. Each row unit 500 further includes a mounting bracket 520 to which is mounted a hopper support beam 522 and a sub-frame 524. The hopper support beam 522 supports a seed hopper 526 and a fertilizer hopper 528 as well as operably supporting a seed meter 530 and a seed tube 532. The subframe 524 operably supports a furrow opening assembly 534 and a furrow closing assembly 536.

In operation of the row unit 500, the furrow opening assembly 534 cuts a furrow 38 into the soil surface 40 as the planter is drawn through the field. The seed hopper 526, which holds the seeds to be planted, communicates a constant supply of seeds 42 to the seed meter 530. The drive module 300 is preferably mounted to the seed meter 530 as described elsewhere herein. As the drive module 300 drives the seed meter 530, individual seeds 42 are metered and discharged into the seed tube 532 at regularly spaced intervals based on the seed population desired and the speed at which the planter is drawn through the field. The seed sensor 508, preferably an optical sensor, is supported by the seed tube 532 and disposed to detect the presence of seeds 42 as they pass. The seed 42 drops from the end of the seed tube 532 into the furrow 38 and the seeds 42 are covered with soil by the closing wheel assembly 536.

The furrow opening assembly 534 preferably includes a pair of furrow opening disk blades 544 and a pair of gauge wheels 548 selectively vertically adjustable relative to the disk blades 544 by a depth adjusting mechanism 568. The depth adjusting mechanism 568 preferably pivots about a downforce sensor 506, which preferably comprises a pin instrumented with strain gauges for measuring the force exerted on the gauge wheels 548 by the soil 40. The downforce sensor 506 is preferably of the type disclosed in Applicant's co-pending U.S. patent application Ser. No. 12/522,253, the disclosure of which is hereby incorporated herein in its entirety by reference. In other embodiments, the downforce sensor is of the types disclosed in U.S. Pat. No. 6,389,999, the disclosure of which is hereby incorporated herein in its entirety by reference. The disk blades 544 are rotatably supported on a shank 554 depending from the subframe 524. Gauge wheel arms 560 pivotally support the gauge wheels 548 from the subframe 524. The gauge wheels 548 are rotatably mounted to the forwardly extending gauge wheel arms 560.

Figure 5B:
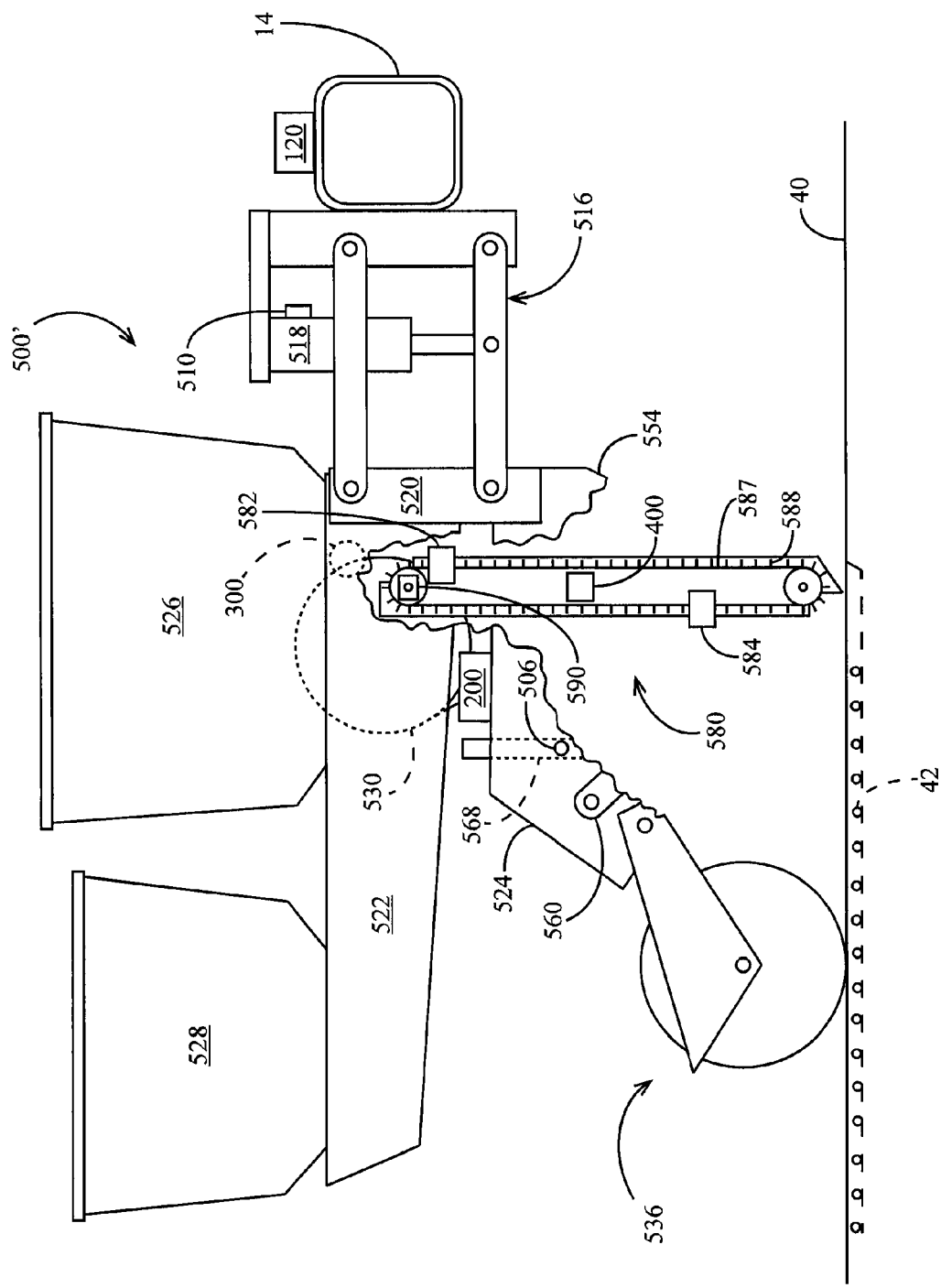
FIG. 5B is a side elevation view of a planter row unit including a seed conveyor and incorporating another embodiment of an electronic control system.

It should be appreciated that the row unit illustrated in FIG. 5A does not include a conveyor 580 such that a conveyor module 400 is not required. Turning to FIG. 5B, a planter row unit 500' including a conveyor 580 is illustrated with components of the control system 100 installed.

The row unit 500' is similar to the row unit 500 described above, except that the seed tube 532 has been removed and replaced with a conveyor 580 configured to convey seeds at a controlled rate from the meter 530 to the furrow 42. The conveyor motor 590 is preferably mounted to the conveyor 580 and is configured to selectively drive the conveyor 580. The conveyor 580 is preferably one of the types disclosed in Applicant's U.S. patent application No. 61/539,786 and Applicant's co-pending international patent application no. PCT/US2012/057327, the disclosures of which are hereby incorporated herein in their entirety by reference. As disclosed in that application, the conveyor 580 preferably includes a belt 587 including flights 588 configured to convey seeds received from the seed meter 530 to a lower end of the conveyor. On the view of FIG. 5B, the seed conveyor 580 is preferably configured to drive the belt 587 in a clockwise direction. On the view of FIG. 5B, the seed conveyor 580 is preferably configured to guide seeds from an upper end of the conveyor down a forward side of the conveyor, such that seeds descend with flights 588 of the belt 587 on forward side of the conveyor 580 and are deposited from the lower end of the conveyor such that no seeds are present on flights 588 ascending the rearward side of the conveyor during normal operation. The optical sensor 582 is preferably mounted to the forward side of the conveyor 580 and disposed to detect seeds and descending conveyor flights 588 as they pass. The optical sensor 584 is preferably mounted to the rearward side of the conveyor 580 and disposed to detect ascending conveyor flights 588 as they return to the meter 530. In other embodiments the optical sensor 582 and/or the optical sensor 584 may be replaced with other object sensors configured to detect the presence of seeds and/or flights, such as an electromagnetic sensor as disclosed in Applicant's co-pending U.S. patent application Ser. No. 12/984,263 (Pub. No. US2012/0169353).

Addition of Modular Components

Comparing the embodiments of FIGS. 5A and 5B, it should be appreciated that some embodiments of control system 100 require a conveyor module 400 while some do not. Thus row buses 250 are preferably configured to allow the user to install one or more additional CAN modules without replacing or modifying the row buses 250.

Figure 6A:
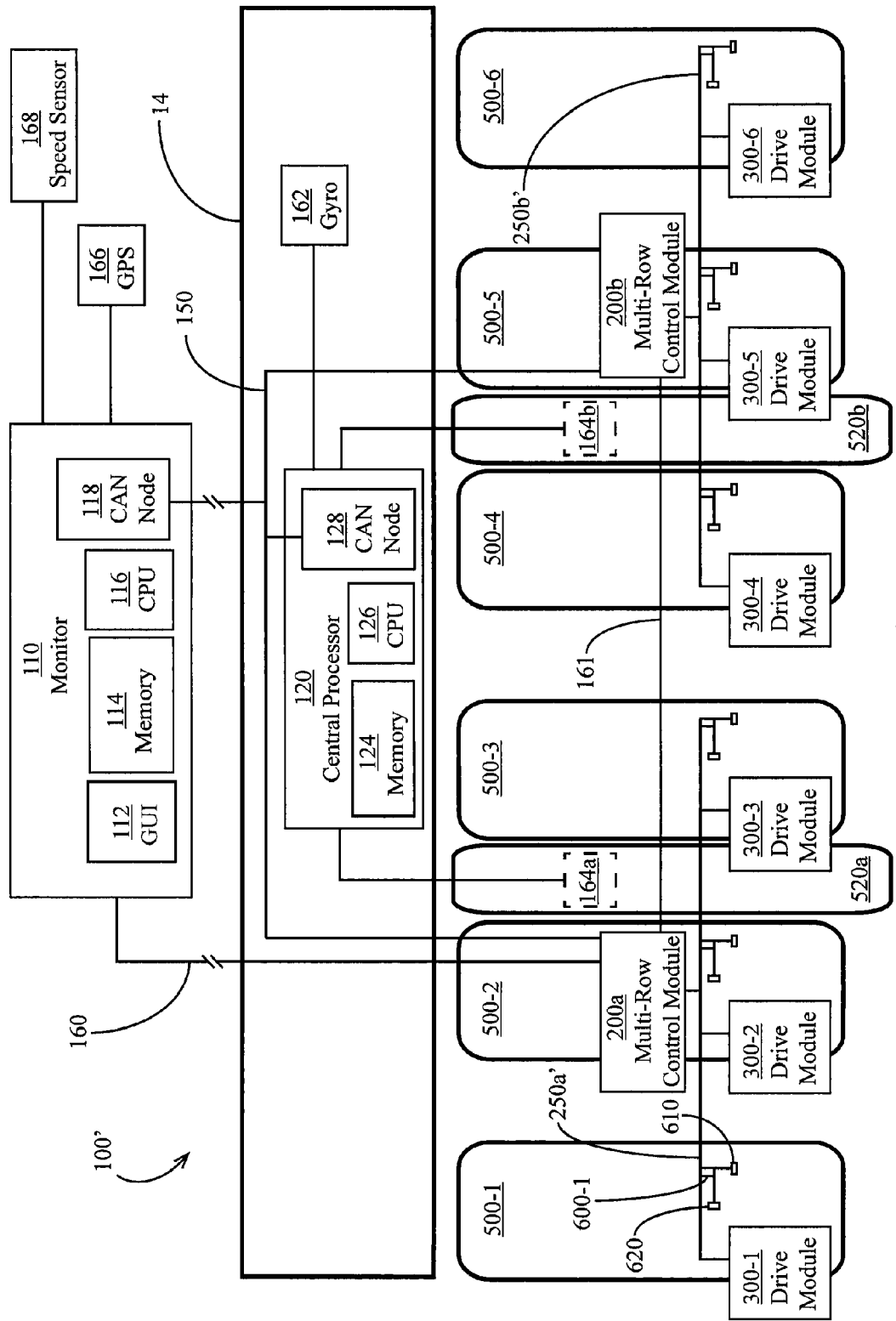
FIG. 6A schematically illustrates another embodiment of an electrical control system including a modular extension at each row.

Referring to FIG. 6A, a modified control system 100' includes modified row buses 250' having a modular extension 600 at each row. Each modular extension 600 preferably includes a first drop 610 and a second drop 620. Each drop 610, 620 preferably includes connections to power, ground and the bus signal lines (e.g., CAN Hi and CAN Lo).

Figure 6B:
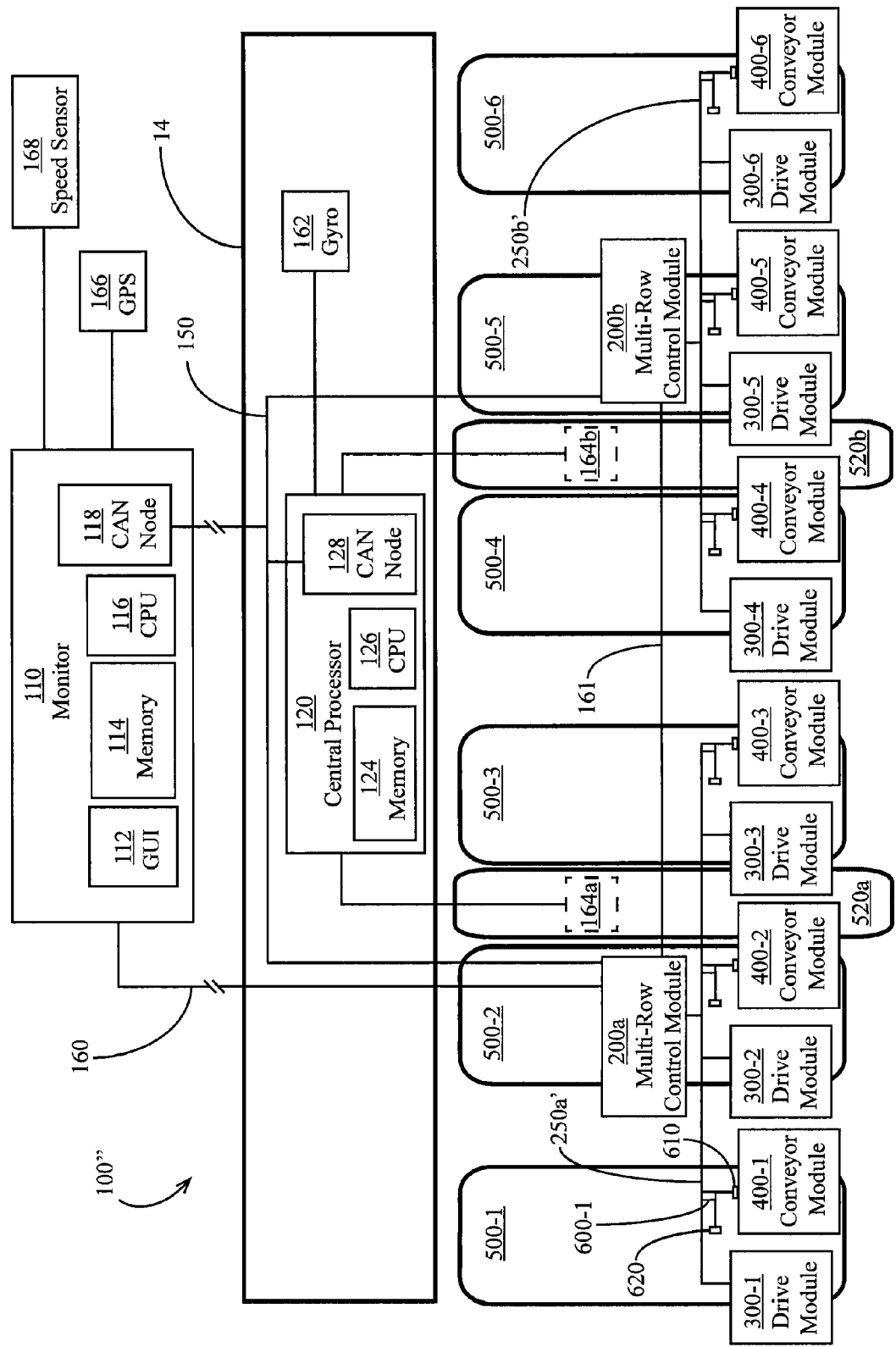
FIG. 6B schematically illustrates the electrical control system of FIG. 6A with a conveyor module installed at each row.

Turning to FIG. 6B, a modified control system 100" differs from control system 100' in that a conveyor module 400 has been connected to the first drop 610 of each modular extension 600. It should be appreciated that the second drop 620 is still available to add further modules to the row networks 130.

Operation—Configuration Phase

Figure 7:
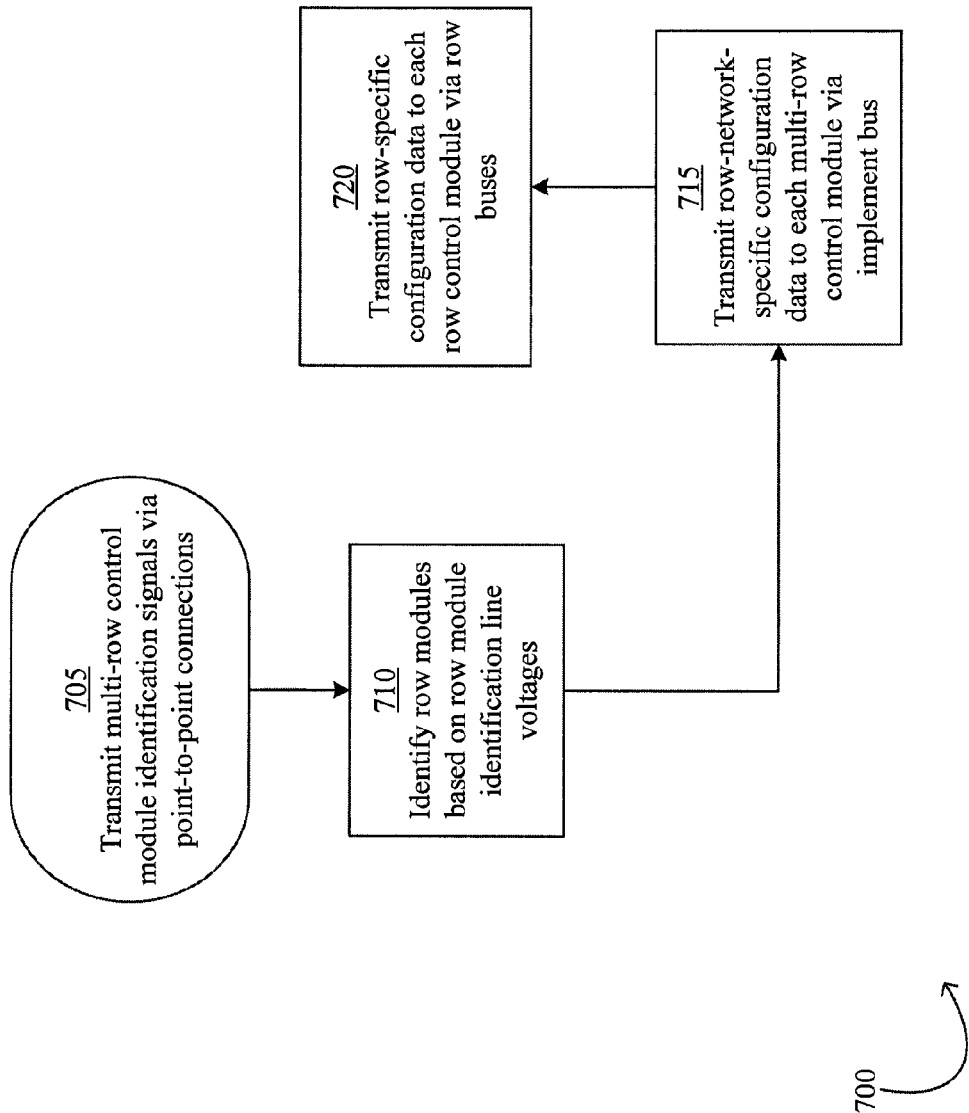
FIG. 7 illustrates an embodiment of a process for transmitting identification and configuration data to a multi-row control module and to a row control module.

In order to effectively operate the control system 100 of FIG. 1, each module is preferably configured to determine its identity (e.g., the row unit or row units 500 with which it is associated) and certain configuration data such as the relative location of its associated row unit. Thus in operation of the control system 100, a configuration process 700 (FIG. 7) is preferably carried out to identify the modules and transmit configuration data to each module. At step 705, the monitor 110 preferably sends a first identification signal to the multi-row control module 200a via a point-to-point connection 160. The multi-row control module 200a preferably stores identification data (e.g., indicating its status as the leftmost multi-row control module) in memory. Continuing to refer to step 705, the multi-row control module 200a preferably sends a second identification signal to the multi-row control module 200b via a point-to-point electrical connection 161. The multi-row control module 200b preferably stores identification data (e.g., indicating its status as the rightmost multi-row control module) in memory.

At step 710, each row module (e.g., each drive module 300 and each conveyor module 400) preferably determines the row unit 500 with which it is associated based on the voltage on an identification line (not shown) connecting the row module to the row bus 150. For example, three identification lines leading to the drive modules 300-1,300-2, 300-3 are preferably connected to ground, a midrange voltage, and a high voltage, respectively.

At step 715, the monitor 110 preferably transmits row-network-specific configuration data to each multi-row control module 200 via the implement bus 150. For example, the configuration data preferably includes transverse and travel-direction distances from each row unit 500 to the GPS receiver 166 and to the center of the toolbar 14 ("GPS offsets"); the row-network-specific GPS offsets sent to multi-row control module 200a at step 715 preferably corresponds to the row units 500-1,500-2,500-3 within the row network 130a. At step 720, each multi-row control module 200 preferably transmits row-unit-specific configuration data to each row control module (e.g, the drive modules 300) via the row buses 250. For example, the multi-row control module 200a preferably sends GPS offsets corresponding to row unit 500-1 to the drive module 300-1.

Operation—Drive Module Control

Figure 8:
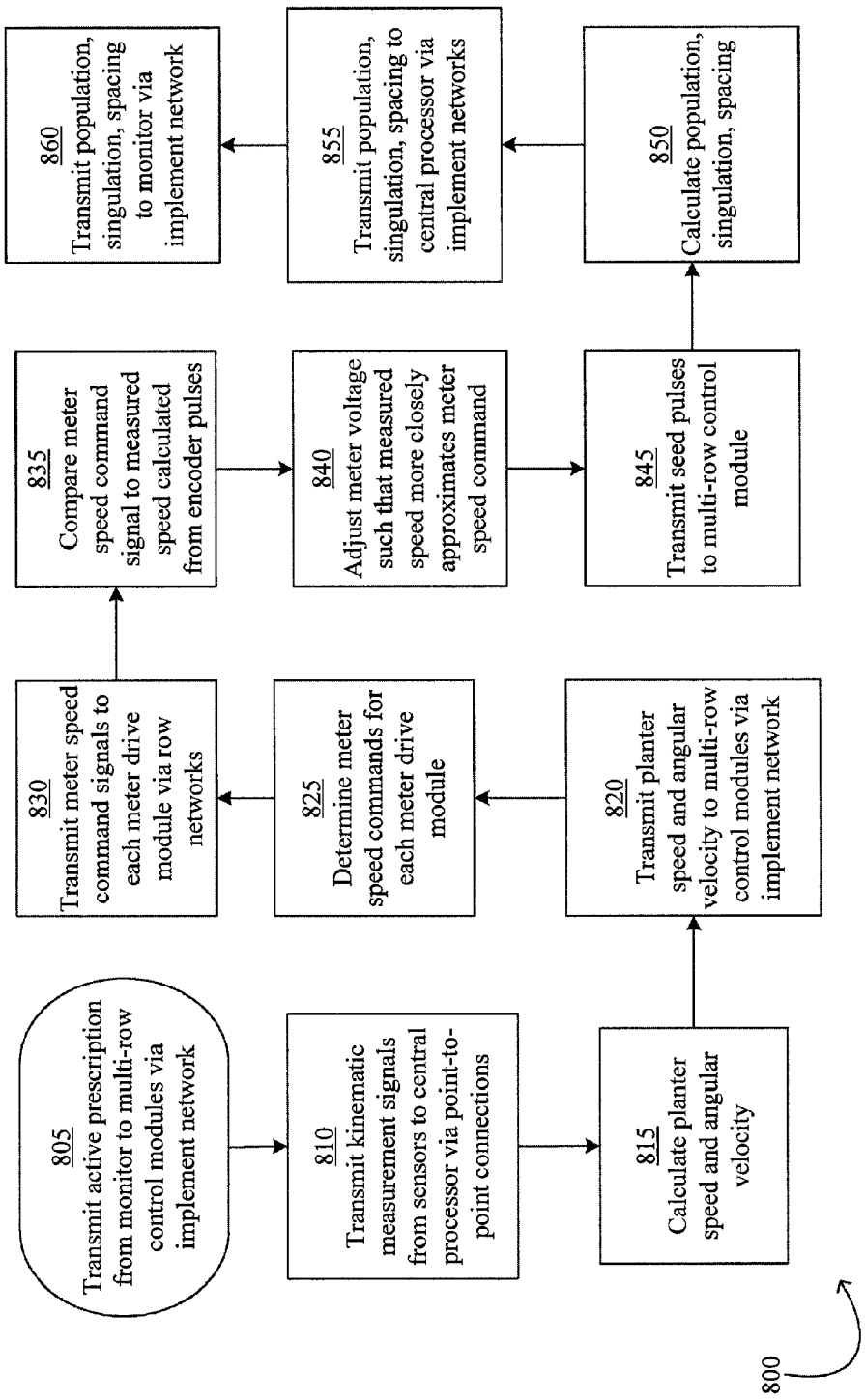
FIG. 8 illustrates an embodiment of a process for controlling a drive module.

Turning to FIG. 8, the control system 100 preferably controls each drive module 300 according to a process 800. At step 805, the monitor 110 preferably transmits an input prescription (e.g., a number of seeds per acre to be planted) to each multi-row control module 200 via the implement bus 150 of the implement network 135. At step 810, the various kinematic sensors in the control system 100 transmit kinematic signals to the central processor 120. For example, wheel speed sensors 164 and gyro 162 send speed signals and angular velocity signals, respectively, to the central processor 120 via point-to-point electrical connections. In some embodiments the monitor 110 also sends the speed reported by the speed sensor 168 to the central processor 120 via the implement bus 150, which speed is sent to the central processor 120 via the implement bus 150.

At step 815, the central processor 120 preferably calculates the speed of the center of the toolbar 14 and the angular velocity of the toolbar 14. The speed Sc of the center of the toolbar may be calculated by averaging the wheel speeds Swa,Swb reported by the wheel speed sensors 164a,164b, respectively or using the tractor speed reported by the speed sensor 168. The angular velocity w of the toolbar 14 may be determined from an angular velocity signal generated by the gyroscope 162 or by using the equation:

$$w = \frac{S_{wa} - S_{wb}}{D_{wa} + D_{wb}}$$

Where:
Dwa=The lateral offset between the center of the toolbar and the left implement wheel 520a, and
Dwb=The lateral offset between the center of the toolbar and the right implement wheel 520b.

At step 820, the central processor 120 preferably transmits the planter speed and angular velocity to each multi-row control module 200 via the implement bus 150 of the implement network 135.

At step 825, each multi-row control module 200 preferably determines a meter speed command (e.g., a desired number of meter rotations per second) for each drive module within its row network 130. The meter speed command for each row unit 500 is preferably calculated based on a row-specific speed Sr of the row unit. The row-specific speed Sr is preferably calculated using the speed Sc of the center of the toolbar, the angular velocity w and the transverse distance Dr between the seed tube (or conveyor) of the row unit from the center of the planter (preferably included in the configuration data discussed in FIG. 7) using the relation:

$S_r = S_c + w \times D_r$

The meter speed command R may be calculated based on the individual row speed using the following equation:

$$R\left(\frac{\text{rotations}}{\text{second}}\right) = \frac{\text{Population}\left(\frac{\text{seeds}}{\text{acre}}\right) \times \text{Row Spacing(ft)} \times S_r\left(\frac{\text{ft}}{\text{s}}\right)}{\text{Meter Ratio}\left(\frac{\text{seeds}}{\text{rotation}}\right) \times 43{,}500\left(\frac{\text{ft}^2}{\text{acre}}\right)}$$

Where:
Meter Ratio=The number of seed holes in the seed disc 534, and
Row Spacing=The transverse spacing between row units 500.

At step 830, the multi-row control module 200 preferably transmits the meter speed command determined for each drive module 300 to the respective drive module via the row bus 250 of the row network 130. In embodiments in which the row bus 250 comprises a CAN bus, the multi-row control module 200 preferably transmits a frame to the row bus having an identifier field specifying a drive module 300 (e.g., module 300-2) and a data field including the meter speed command for the specified drive module.

At step 835, the drive module 300 preferably compares the meter speed command R to a measured meter speed. The drive module 300 preferably calculates the measured meter speed using the time between encoder pulses received from the motor encoder 576. At step 840, the drive module 300 preferably adjusts a voltage used to drive the meter 530 in order to adjust the measured meter speed closer to the meter speed command R.

At step 845, each seed sensor sends seed pulses to the associated multi-row control module 200. In embodiments including a seed tube 532, each seed sensor 508 preferably sends seed pulses to the associated multi-row control module 200 via point-to-point electrical connections. In embodiments including a seed tube 532, seed pulses preferably comprise signal pulses having maximum values exceeding a predetermined threshold. In some embodiments including a seed conveyor 580, each seed sensor 582 preferably sends seed pulses to the associated multi-row control module 200 via the implement bus 250 of the row network 130. In embodiments including a seed conveyor 580, the seed pulses comprise signal pulses that differ by a predetermined threshold from signal pulses caused by passing flights of the conveyor. Alternative methods of detecting seeds in a seed conveyor 580 are described later herein.

At step 850, the multi-row control module 200 preferably calculates the population, singulation and seed spacing at each row unit 500 within the row network 130 using the row speed Sr and the seed pulses transmitted from each row unit within the row network. At step 855, the multi-row module 200 transmits the population, singulation and spacing values to the central processor 120 via the implement bus 150 of the implement network 130. At step 860, the central processor 120 preferably transmits the population, singulation and spacing values to the monitor 110 via the implement bus 150 of the implement network 135.

Operation—Conveyor Module Control

Figure 9:
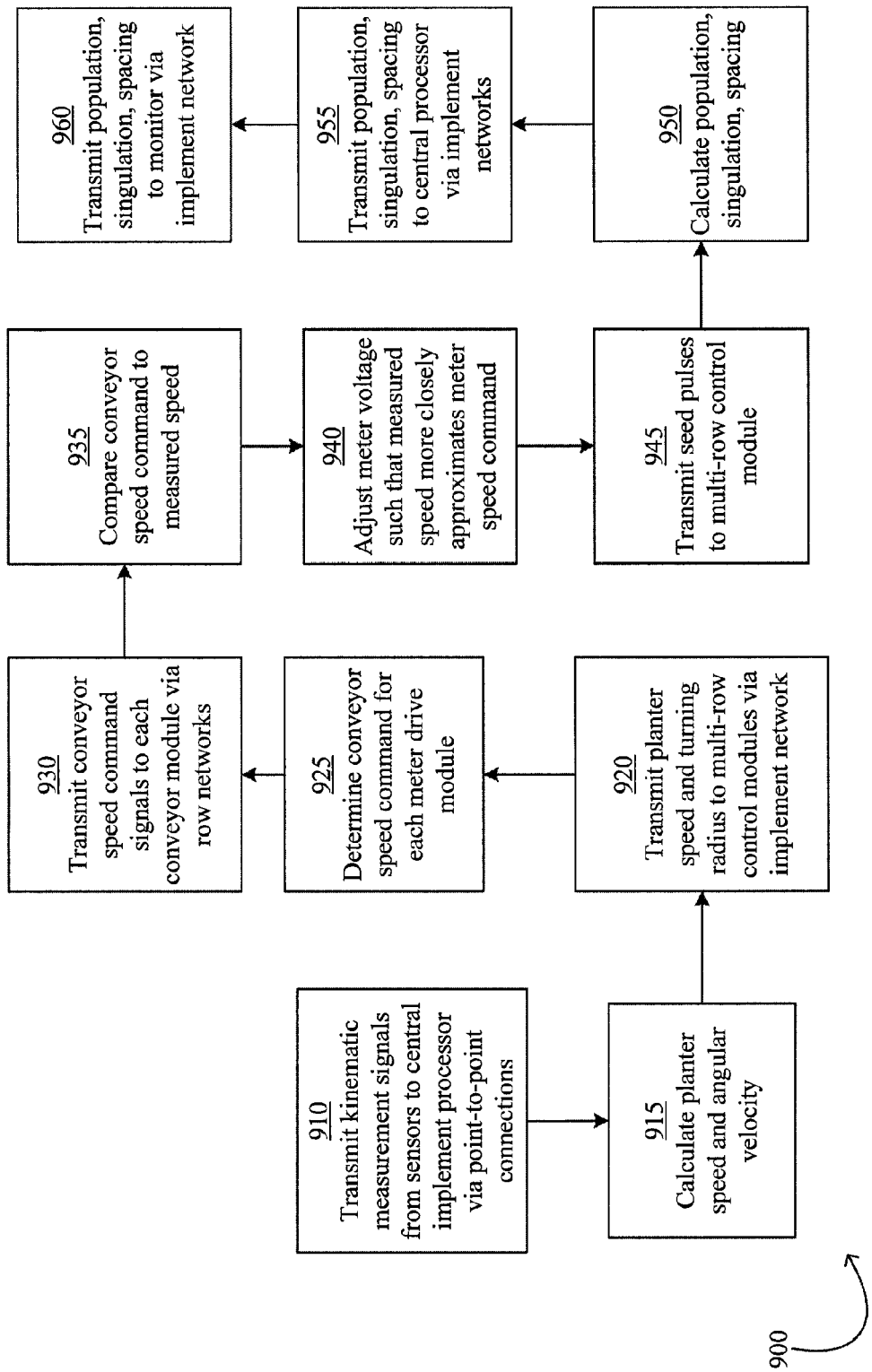
FIG. 9 illustrates an embodiment of a process for controlling a conveyor module.

Turning to FIG. 9, the control system 100 preferably controls each conveyor module 400 according to a process 900. At steps 910 through 920, control system 100 preferably performs the same steps described with respect to steps 810 through 820 of process 800. At step 925, each multi-row control module 200 preferably determines a conveyor speed command for each conveyor module 400 within the row network 130. The conveyor speed command is preferably selected such that a linear speed of flights traveling down the conveyor is approximately equal to the row-specific speed Sr; e.g., the conveyor motor speed command is preferably equal to the row-specific speed Sr multiplied by a predetermined constant. At step 930, the multi-row control module 200 preferably transmits individual conveyor speed commands to each corresponding conveyor module 400 via the row bus 250 of the row network 130.

At step 935, the conveyor module 400 preferably compares the conveyor speed command to a measured conveyor speed. In some embodiments, the conveyor speed is measured using the time between flight pulses resulting from conveyor flights passing the optical sensor 584. In other embodiments, the conveyor speed is measured using the time between encoder pulses received from the conveyor motor encoder 597. At step 940, the conveyor module 400 preferably adjusts a voltage used to drive the conveyor motor 590 in order to adjust the measured meter speed closer to the conveyor speed command.

At steps 945 through 960, the conveyor module 400 preferably performs the same steps 845 through 860 described herein with respect to process 800, specifically as those steps are described for embodiments including a conveyor 580.

Seed Sensing Methods

In embodiments including a seed conveyor 580, the control system 100 is preferably configured to count seeds, time-stamp seeds, and determine a seeding rate based on the signals generated by the first and second optical sensors 582, 584. It should be appreciated that in normal operation, the first optical sensor 582 detects both seeds and conveyor flights as the seeds from the meter 530 descend the conveyor 580, while the second optical sensor 584 detects only conveyor flights as they return to the top of the conveyor after seeds are deposited. The shape and size of flights in the conveyor 580 are preferably substantially consistent.

Figure 17:
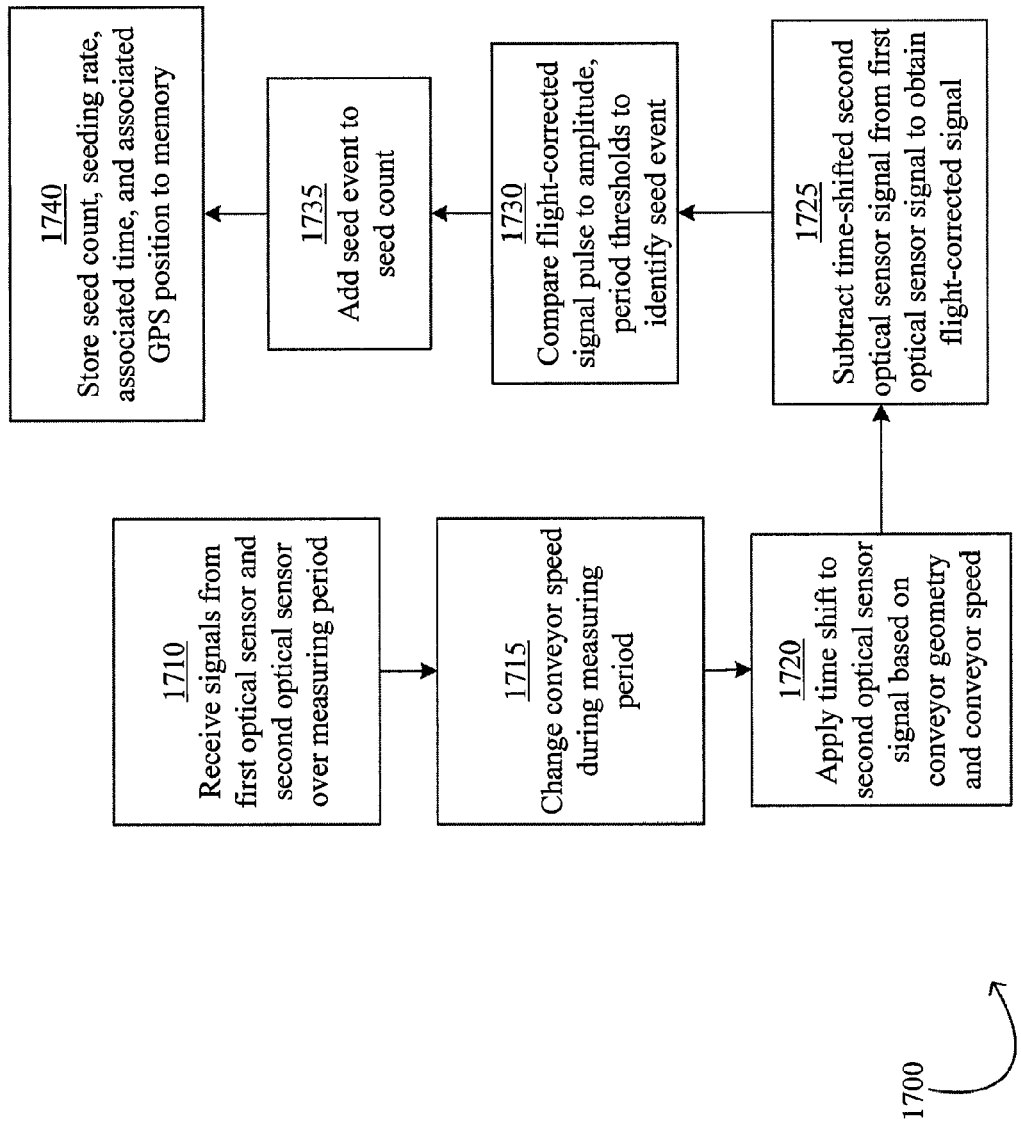
FIG. 17 illustrates an embodiment of a process for counting seeds using two optical sensors associated with a seed conveyor.
Figure 18:
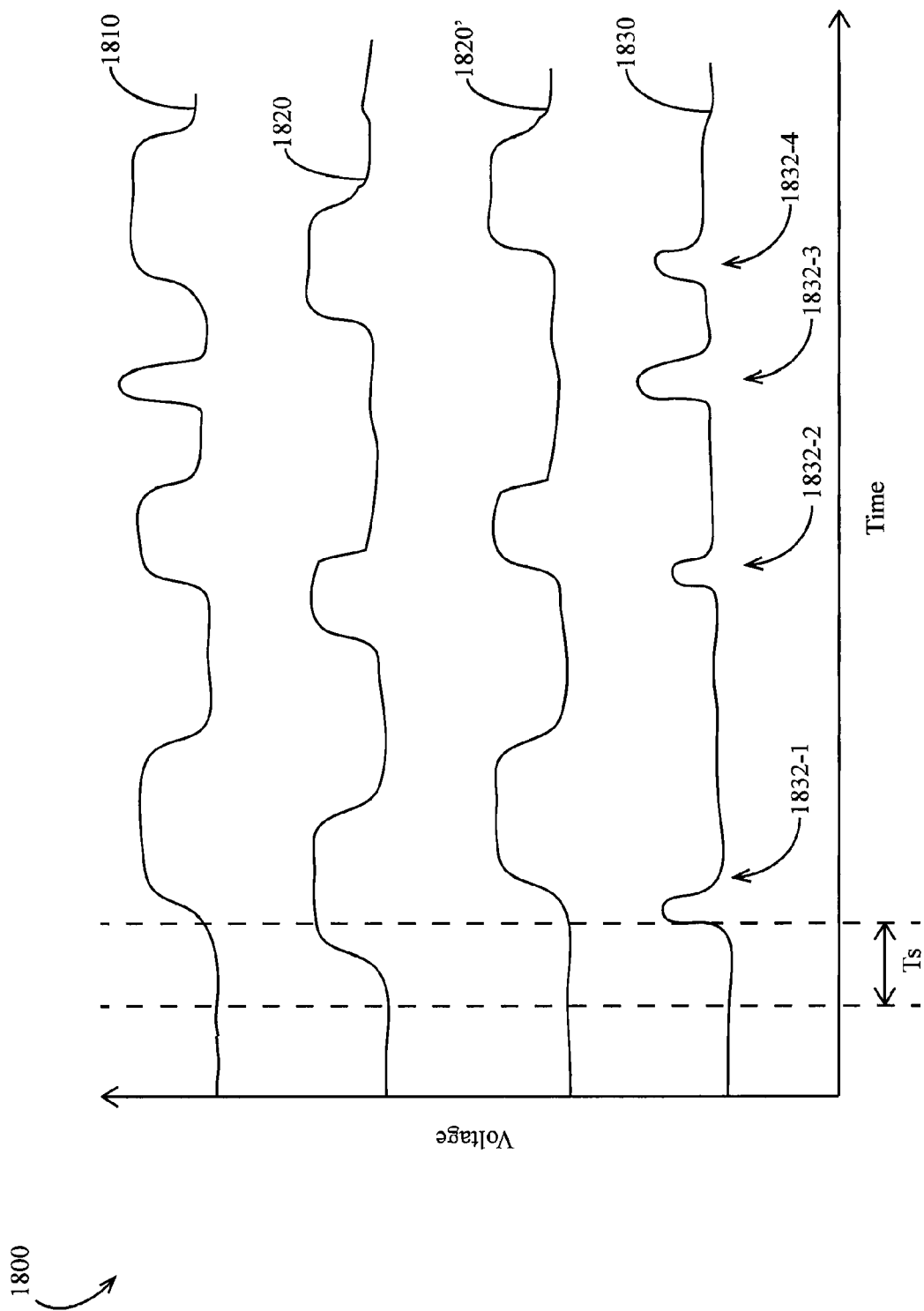
FIG. 18 illustrates exemplary signals generated by optical sensors associated with a seed conveyor.

Referring to FIG. 17, the monitor 110 (or in some embodiments the central processor 120) is preferably configured to carry out a process 1700 for detecting seeds. At step 1710, the monitor 110 preferably receives signals from both the first optical sensor 582 and the second optical sensor 584 over a measuring period. A first optical sensor signal 1810 (in which amplitude increases when either flights or seeds pass) and a second optical sensor signal 1820 (in which amplitude increases when flights pass) are illustrated on an exemplary multi-signal graph 1800 in FIG. 18. At step 1715, the control system 100 preferably changes the conveyor speed during the measuring period such that the length of signal pulses resulting from belts having the same length (as best illustrated by viewing the varying-width pulses in the sensor signal 1820). At step 1720, the monitor 110 preferably applies a time shift Ts (e.g., the time shift Ts illustrated in FIG. 18) to the second optical sensor signal 1820, resulting in a time-shifted sensor signal 1820'. The time shift Ts is related to the conveyor speed and is preferably calculated as follows:

$$Ts = k \times Tf$$

Where:
Tf=Average time between flights detected by the second optical sensor 258
k=A constant value preferably determined as described below.

The value of k is related to the conveyor and optical sensor geometry and in some embodiments is determined as follows:

$$k = Tf \times DEC\left(\frac{Ds}{Df}\right)$$

Where:
Ds=Linear flight distance between the first and second optical sensors

Df=Distance between flights
DEC(x) returns the decimal portion of x (e.g., DEC (105.2)=0.2).

In other embodiments, the monitor 110 preferably calculates k empirically in a setup stage while seeds are not being planted by running the conveyor 580 at a constant speed and determining the values of Tf and Ts; with no seeds on the belt, the value of Ts may be determined by measuring the time between a flight pulse at the first optical sensor 582 and the next subsequent flight pulse at the second optical sensor 584. In still other embodiments, the sensors 582, 584 are positioned at a relative distance Ds equal to an integer multiple of Df such that no time shift or a near-zero time shift is required.

Continuing to refer to the process 1700 of FIG. 17, at step 1725 the monitor 110 preferably subtracts the time-shifted second optical sensor signal 1820' from the first optical sensor signal 1810, resulting in a flight-corrected signal 1830 (see FIG. 18) which correlates to the signal from the first optical sensor signal with signal pulses resulting from conveyor flights substantially eliminated. At step 1730 the monitor 110 preferably compares pulses 1832 in the flight-corrected signal 1830 to one or more seed pulse validity thresholds (e.g., a minimum amplitude threshold and a minimum period threshold); the monitor preferably identifies each pulse exceeding the seed pulse validity thresholds as valid seed event. At step 1735, the monitor 110 preferably adds the identified seed event to a seed count. At step 1740, the monitor 110 preferably stores the seed count; seeding rate (e.g., the seed count over a predetermined time period); a time associated with the seed event, seed count, or seeding rate; and a GPS associated with the seed event, seed count, or seeding rate to memory for mapping, display and data storage.

Alternative Embodiments—Single Row Networks

Figure 16:
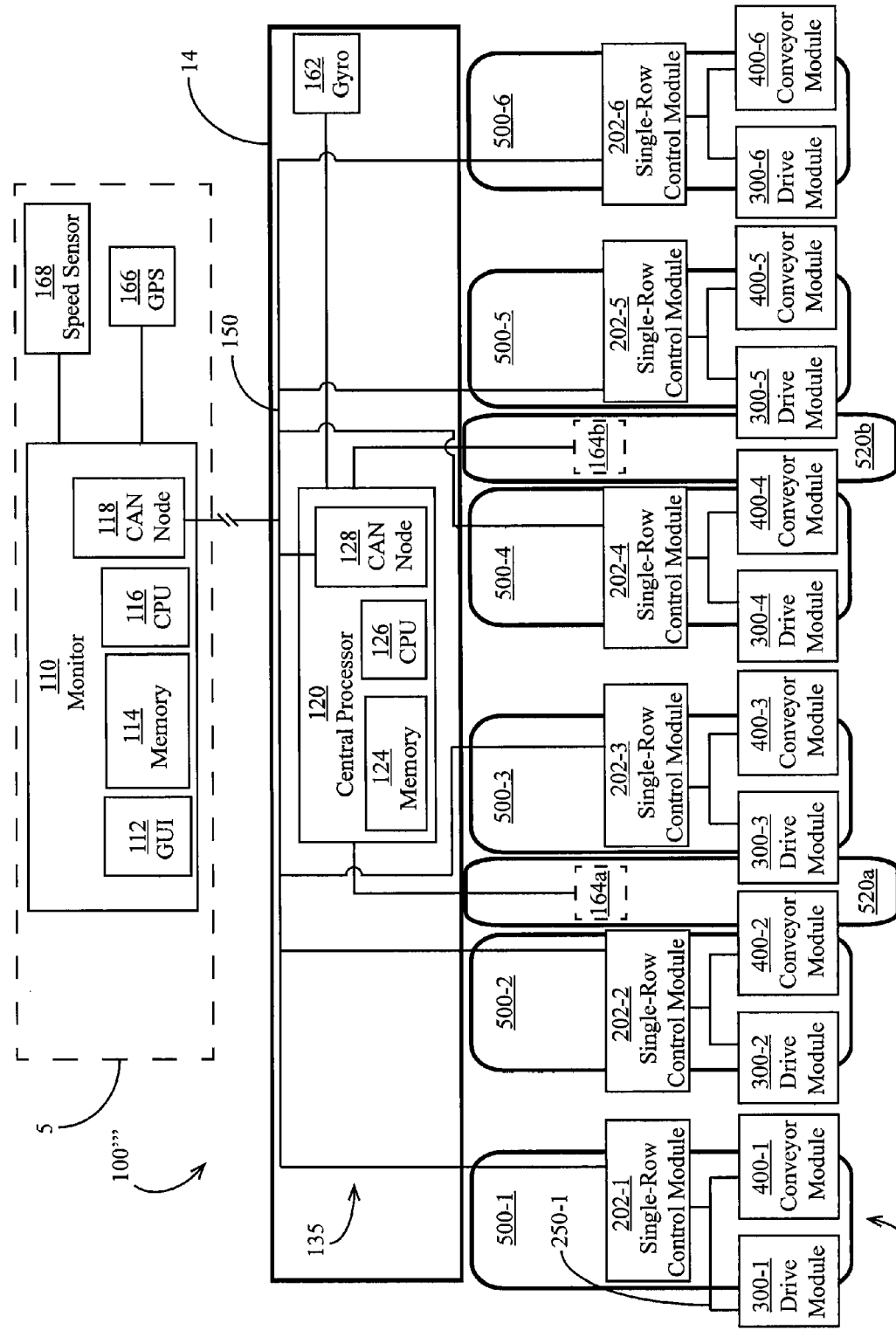
FIG. 16 schematically illustrates another embodiment of an electrical control system for controlling and monitoring an agricultural implement having a plurality of rows.

In an alternative control system 100''' illustrated in FIG. 16, each of a plurality of row networks 132 includes a single-row control module 202 mounted to one of the row units 500, a row bus 250, a drive module 300 individually mounted to the same row unit 500, and a conveyor module 400 individually mounted to the same row unit 500. The single-row control module 202 preferably includes equivalent components to the multi-row control module 200, except that the downforce signal conditioning chip 206, seed sensor auxiliary input 208, and the downforce solenoid PWM driver 210 are only in electrical communication with one of the corresponding devices mounted to the same row unit 500. Additionally, in the alternative control system 100''' the row bus 250 is in electrical communication with a single drive module 300 and a single conveyor module 400 as well as the single-row control module 202.

Figure 19:
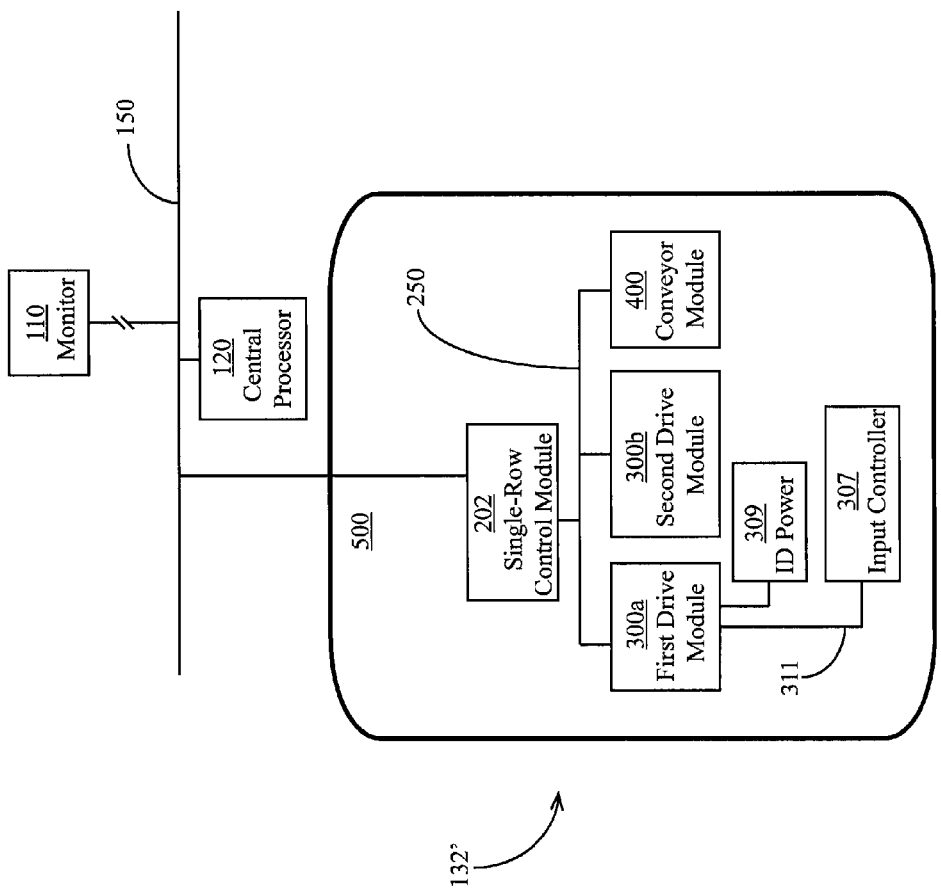
FIG. 19 illustrates an embodiment of a single-row network.

In still other embodiments, two seed meters 530 are mounted to a single row unit 500 as described in U.S. Provisional Patent Application No. 61/838,141. In such embodiments, a drive module 300 is operably coupled to each seed meter 530. A row network 132' having two drive modules 300 is illustrated in FIG. 19. The row network 132' preferably includes a single-row control module 202, a row bus 250, a first drive module 300a (preferably mounted to the row unit 500), a second drive module 300b (preferably mounted to the row unit 500), a conveyor module 400, an input controller 307 and an identification power source 309. The first drive module 300a and the second drive module 300b, including the hardware and software components, are preferably substantially identical. The single-row control module 202, the first drive module 300a, the second drive module 300b, and the conveyor module 250 are preferably in electrical communication with the row bus 250. The single-row control module 202 is preferably in electrical communication with an implement bus 150 of one of the control system embodiments described herein. The first drive module 300a is preferably in electrical communication with the identification power source 309 and the input controller 307. The first drive module 300a is preferably in electrical communication with the input controller 307 via an electrical line 311. The identification power source 309 preferably supplies a low-voltage signal to the first drive module 300a, and may comprise a point-to-point connection to a power source including a relatively large resistor. The input controller 307 is preferably a swath and/or rate controller configured to shut off and/or modify an application rate of a crop input such as (without limitation) liquid fertilizer, dry fertilizer, liquid insecticide, or dry insecticide.

In other embodiments, each row unit 500 includes an additional drive module 300 which drives a metering apparatus that meters out an additional crop input (e.g., insecticide, fertilizer, or other granular or liquid crop inputs). The row unit may have common components with the row units described in U.S. Pat. Nos. 6,938,564; 7,481,171; and/or U.S. patent application Ser. No. 12/815,956, each of which is incorporated herein in its entirety by reference. The additional drive module may be provided on individual row units and connected to the associated control modules of any of the control systems 100, 100', 100", 100"', or the control system including row network 132' described herein. As illustrated, the additional drive module is preferably connected to the remainder of the control system by an electrical connector 2050.

The additional drive module 300 may comprise a granular metering device (e.g., driven by an electric motor as described below), a valve (e.g., a liquid flow control valve or butterfly valve), a pump (e.g., a variable-rate pump), or any other device suitable for varying the rate of application of a secondary crop input.

In some embodiments, the additional drive module 300 drives the metering apparatus at a drive speed appropriate to meter the crop input at a predefined application rate (e.g., measured in pounds per acre). For example, the drive speed is preferably selected based on the implement speed in order to meter crop input at the predefined application rate. In some embodiments, the drive speed may be selected based on the row-specific speed Sr of the row unit, which may be calculated as described herein. In some embodiments, the predefined application rate comprises a prescription map which varies the desired application rate at various locations in the field; in such embodiments, the control system preferably compares the current location reported by the GPS receiver 166 to the prescription map in order to identify the predefined application rate.

Figure 20:
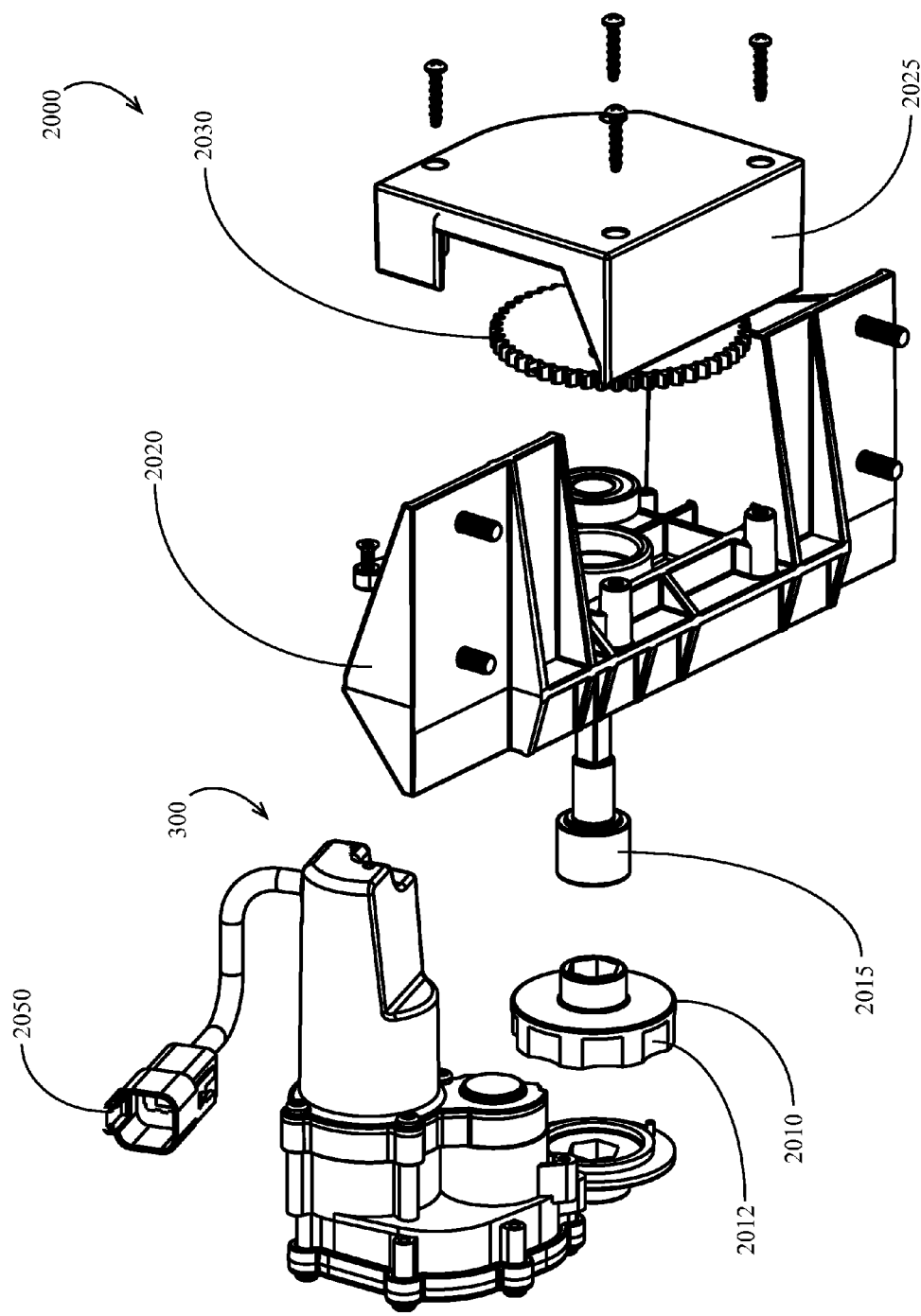
FIG. 20 is an exploded view of a drive assembly for metering an additional crop input with an additional drive module.
Figure 21:
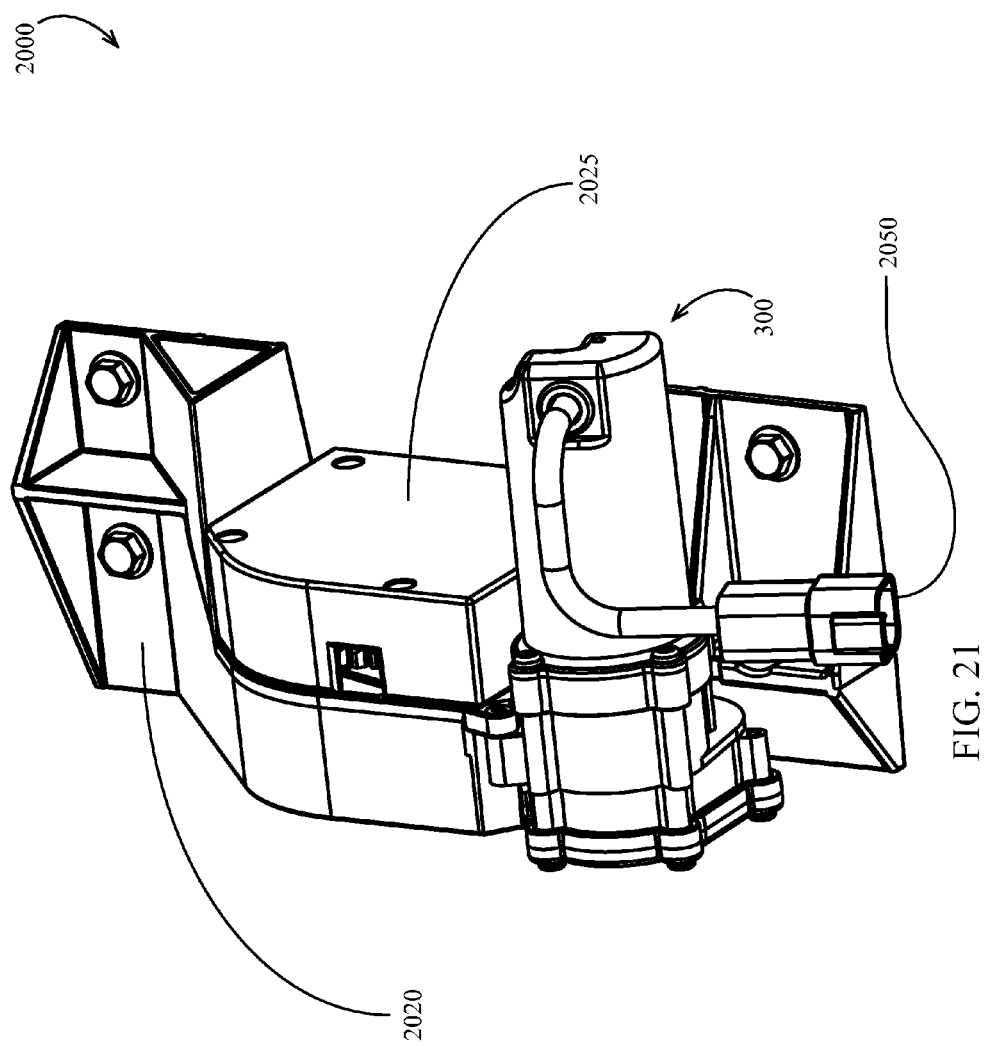
FIG. 21 is an unexploded perspective view of the drive assembly of FIG. 20.
Figure 22:
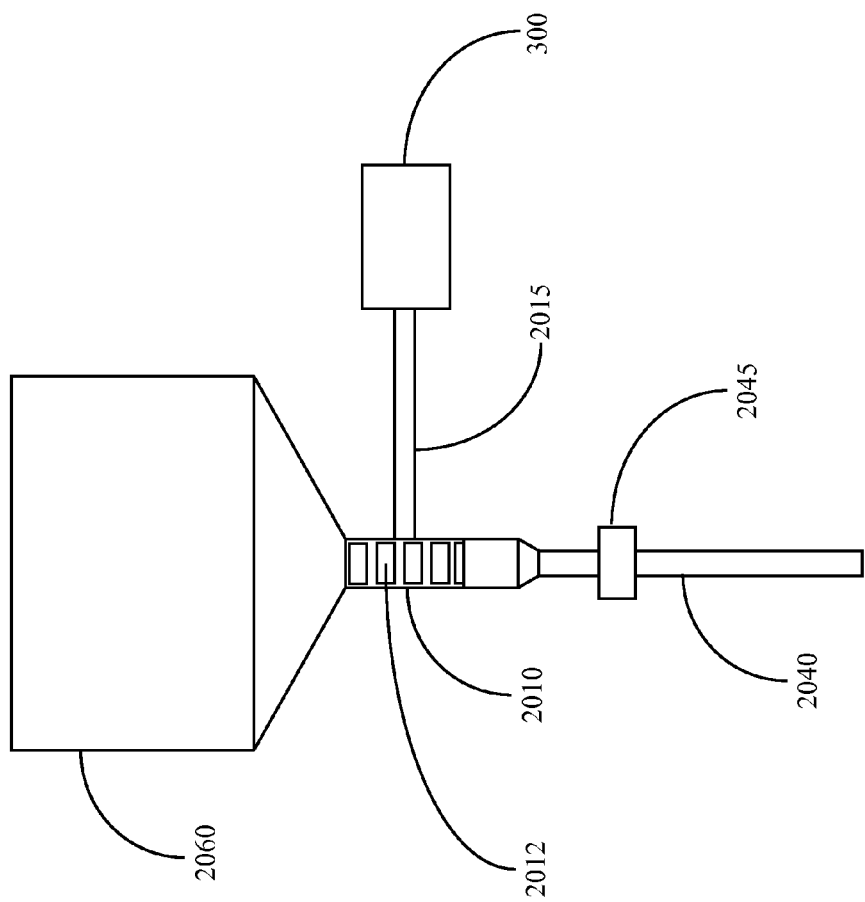
FIG. 22 schematically illustrates a row unit incorporating an additional drive module for metering an additional drive input.

Turning to FIGS. 20-22, one such row unit embodiment including an additional drive module 300 for metering an additional crop input is illustrated. The drive module 300 preferably drives a metering apparatus such that the additional crop input is metered from a storage apparatus to the soil. Referring to FIG. 22, the metering apparatus preferably comprises a metering wheel 2010 having a plurality of symmetrically circumferentially arranged pockets 2012 which, when rotated, sequentially receive crop input from a hopper 2060 and sequentially deposit the crop input by gravity into the soil, e.g., via a tube 2040 which directs the crop input into the soil. In some embodiments, a sensor 2045 (e.g., an optical, electromagnetic or impact-type sensor) in data communication with the monitor 110 and/or the central processor 120 may be placed between the metering wheel and the soil (e.g., incorporated in the tube 2040) and disposed to generate an application rate signal related to the application rate of the crop input. In some such embodiments, the control system may adjust a drive rate commanded to the drive module 300 such that the application rate indicated by the application rate signal approaches a desired application rate (e.g., the application rate specified by the prescription map for the current location reported by the GPS receiver). The application rate signal may additionally or alternatively be used to report the current application rate at one or more row units to the user via the monitor 110 or to create a map of as-applied crop input application rate for the field.

Referring to FIGS. 20 and 21, a drive assembly 2000 is illustrated in detail. A housing 2020 is preferably mounted (e.g., bolted as illustrated) to an upper surface of the row unit frame. A cover 2025 is removably mounted to the housing 2020 (as best illustrated in FIG. 21) in order to shield internal components including a reducing gear 2030. The reducing gear is preferably driven for rotation by the output gear 312 (see FIG. 15) of the drive module 300. The reducing gear 2030 is preferably larger (e.g., has a greater number of gear teeth) than the output gear 312 such that the reducing gear rotates more slowly (e.g., in rotations per minute) than the output gear. The reducing gear preferably drives a driveshaft 2015 for rotation. The driveshaft 2015 is preferably fixedly mounted to the reducing gear 2030 at a first end such that the driveshaft rotates about the central axis of the reducing gear. The driveshaft 2015 is preferably fixedly mounted to the metering wheel such that the driveshaft drives the metering wheel for rotation about a the central axis of the driveshaft.

During a setup phase of operation of the row network 132', the first drive module 300a receives a signal from the identification power source 309 and sends a corresponding identification signal to the monitor 110 (and/or the central processor 120) identifying itself as the first drive module 300a. Subsequently, the monitor 110 (and/or the central processor 120) preferably sends commands to the first drive module 300a and stores data received from the first drive module 300a based on the identification signal.

During field operation of the row network 132', the monitor 110 determines which seed meter 530 should be seeding by comparing position information received from the GPS receiver 166 to an application map. The monitor 110 then preferably commands the single-row control module 202 to send a desired seeding rate to the drive module associated with the meter 530 that should be seeding, e.g., the first drive module 300a.

In embodiments in which the input controller 307 comprises a swath controller configured to turn a dry or liquid crop input on or off, the first drive module 300a preferably sends a command signal to the input controller commanding the input controller to turn off the associated input, e.g., by closing a valve. In embodiments including only a single seed meter 530 and a single drive module 300 associated with each row unit, the drive module 300 transmits a first signal (e.g., a high signal) via the line 311 to the input controller 307 when the drive module is commanding the seed meter to plant, and transmits a second signal (e.g., a low signal) or no signal when the drive module is not commanding the seed meter to plant. The line 311 is preferably configured for electrical communication with any one of a plurality of input controllers, e.g. by incorporating a standard electrical connector. The first and second signal are preferably selected to correspond to swath commands recognized by any one of a plurality of input controllers such that the input controller 307 turns off the crop input when the seed meter 530 is not planting and turns on the crop input when the seed meter 530 is planting.

In embodiments in which the input controller 307 comprises a swath controller and in which each row unit includes two seed meters 530 and associated drive modules 300a, 300b, the first drive module 300a preferably receives a signal from the row bus 250 (preferably generated either by the single-row control module 202 or the second drive module 300b) indicating whether the second drive module is commanding its associated seed meter 530 to plant. The first drive module 300a then determines whether either the first drive module 300a or 300b is commanding either of the seed meters 530 to plant. If neither of the drive modules 300a, 300b are commanding either seed meter to plant, the first drive module 300a preferably sends a first signal to the input controller 307 via the line 311. The input controller 307 is preferably configured to turn off the crop input (e.g., by closing a valve) upon receiving the first signal. If either of the drive modules 300a, 300b are commanding either seed meter to plant the first drive module 300a preferably sends a second signal (or in some embodiments no signal) to the input controller 307 such that the input controller does not turn off the crop input.

In embodiments in which the input controller 307 comprises a rate controller configured to modify the application rate of a dry or liquid crop input, the monitor 110 (and/or the central processor 120) preferably determines a desired crop input application rate and transmits a corresponding signal to the input controller.

Components described herein as being in electrical communication may be in data communication (e.g., enabled to communicate information including analog and/or digital signals) by any suitable device or devices including wireless communication devices (e.g., radio transmitters and receivers).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A control system for an agricultural implement having a plurality of row units, said control system comprising:
a first drive module mounted to a first row unit of the plurality of row units of the agricultural implement, said first drive module driving a first metering apparatus associated with said first row unit for metering a first crop input released from said first metering apparatus, said first drive module adapted to vary an application rate of said first crop input released from said first metering apparatus;
a second drive module mounted to said first row unit, said second drive module varying a speed of an electric motor driving one of: (i) a conveyor disposed to receive said released first crop input from said first metering apparatus and (ii) a secondary metering apparatus associated with said first row unit;
a sensor disposed to generate signals upon detection of said released first crop input passing said sensor;
a control module mounted to said first row unit and disposed to receive said generated signals from said sensor, and wherein said control module is in data communication with said first drive module and said second drive module; and
a central processor in data communication with said control module, said central processor transmitting a first non-row-specific command to said control module;
wherein said control module determines a first row-specific command based on said first non-row-specific command and a first row-specific operating criterion;
wherein said control module calculates at least one of population, singulation and spacing of said first crop input based on said generated signals received from said sensor; and
wherein said control module communicates to said central processor, said calculated at least one of population, singulation and spacing of said first crop input.

2. The control system of claim 1, wherein said first crop input is seed, and wherein said first metering apparatus is a seed meter for metering said seed released from said seed meter, and wherein said electric motor drives said conveyor, said seed conveyor conveying said released seed from said seed meter to a soil surface.

3. The control system of claim 1, wherein said first crop input is a granular insecticide, and wherein said first metering apparatus is a granular insecticide meter for metering said granular insecticide released from said granular insecticide meter, wherein said first drive module drives said first metering apparatus at a variable speed, and wherein said application rate of said granular insecticide released by said first metering apparatus varies directly with said variable speed.

4. The control system of claim 3, wherein said granular insecticide meter receives said granular insecticide from an insecticide hopper and meters said granular insecticide released from said granular insecticide meter into a conduit associated with said first row unit, said conduit guiding said released granular insecticide into a planting trench opened by said first row unit.

5. The control system of claim 4, wherein said secondary metering apparatus is a seed meter for metering seed released from said secondary metering apparatus as a second crop input.

6. The control system of claim 1, wherein said first crop input is a granular fertilizer, and wherein said first metering apparatus is a granular fertilizer meter for metering granular fertilizer released from said granular fertilizer meter, wherein said first drive module drives said first metering apparatus at a variable speed, and wherein said application rate of said granular fertilizer released by said first metering apparatus varies directly with said variable speed.

7. The control system of claim 6, wherein said granular fertilizer meter receives said granular fertilizer from a fertilizer hopper and meters said granular fertilizer released from said granular fertilizer meter into a conduit associated with said first row unit, said conduit guiding said released granular fertilizer into a planting trench opened by said first row unit.

8. The control system of claim 7, wherein said secondary metering apparatus is a seed meter for metering seed released from said secondary metering apparatus as a second crop input.

9. The control system of claim 1, wherein said first row-specific operating criterion comprises a speed of said first row unit.

10. The control system of claim 9, wherein said first non-row-specific command comprises an application rate of said first crop input, and wherein said first row-specific command comprises a metering speed of said first metering apparatus.

11. The control system of claim 10, wherein said electric motor drives said conveyor, said conveyor conveying said released first crop input received from said first metering apparatus to a soil surface.

12. The control system of claim 1, wherein said first row-specific operating criterion comprises a location of said first row unit.

13. The control system of claim 1, wherein said first crop input is seed, and wherein said first metering apparatus is a seed meter for metering said seed released from said seed meter, wherein said first non-row-specific command comprises an application rate of said seed, wherein said first row-specific operating criterion comprises a speed of said first row unit, and wherein said electric motor drives said secondary metering apparatus, said secondary metering apparatus metering a second crop input released from said secondary metering apparatus at a secondary application rate, said secondary application rate varying directly with an operating speed of said electric motor.

14. The control system of claim 13, wherein said central processor transmits a second non-row-specific command to said control module, wherein said control module determines a second row-specific command based on said second non-row-specific command and said first row-specific operating criterion, wherein said second row-specific command comprises a speed of said electric motor.

15. The control system of claim 14, wherein said second crop input comprises granular insecticide.

16. The control system of claim 15, wherein said secondary metering apparatus receives said granular insecticide from an insecticide hopper and deposits said released granular insecticide from said secondary metering apparatus into a conduit associated with said first row unit, said conduit guiding said released granular insecticide into a planting trench opened by said first row unit.

17. The control system of claim 16, wherein said secondary metering apparatus comprises a metering wheel having a plurality of circumferentially arranged pockets, said pockets sequentially receiving said granular insecticide from said insecticide hopper as each pocket passes an outlet of said insecticide hopper, said pockets sequentially depositing said released granular insecticide by gravity into said conduit associated with said first row unit.

18. The control system of claim 14, wherein said second crop input comprises fertilizer.

19. The control system of claim 13, wherein said second crop input comprises granular insecticide.

20. The control system of claim 13, wherein said second crop input comprises fertilizer.

* * * * *